(12) United States Patent
Myokan

(10) Patent No.: US 10,453,219 B2
(45) Date of Patent: Oct. 22, 2019

(54) IMAGE PROCESSING APPARATUS AND IMAGE PROCESSING METHOD

(71) Applicant: SONY CORPORATION, Tokyo (JP)

(72) Inventor: Yoshihiro Myokan, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/571,165

(22) PCT Filed: Jun. 3, 2016

(86) PCT No.: PCT/JP2016/066568
§ 371 (c)(1),
(2) Date: Nov. 1, 2017

(87) PCT Pub. No.: WO2016/203988
PCT Pub. Date: Dec. 22, 2016

(65) Prior Publication Data
US 2018/0350107 A1  Dec. 6, 2018

(30) Foreign Application Priority Data

Jun. 17, 2015 (JP) .................................. 2015-122068

(51) Int. Cl.
*H04N 5/232* (2006.01)
*G06T 7/80* (2017.01)
(Continued)

(52) U.S. Cl.
CPC .................. *G06T 7/85* (2017.01); *G01C 3/06* (2013.01); *G06T 3/0075* (2013.01);
(Continued)

(58) Field of Classification Search
CPC ........... G06T 7/85; G06T 7/74; G06T 3/0093; G06T 7/337; G06T 2207/30244; G06T 2207/10012; H04N 5/23222
See application file for complete search history.

(56) References Cited

U.S. PATENT DOCUMENTS

| | | | |
|---|---|---|---|
| 9,262,681 B1* | 2/2016 | Mishra | G06K 9/00771 |
| 2012/0224032 A1* | 9/2012 | Takiguchi | G06T 7/33 |
| | | | 348/47 |
| 2013/0070055 A1* | 3/2013 | Atanassov | H04N 13/246 |
| | | | 348/46 |

FOREIGN PATENT DOCUMENTS

| | | |
|---|---|---|
| JP | 2007-263669 | 10/2007 |
| JP | 2012-023561 | 2/2012 |
| JP | 2012-177676 | 9/2012 |

OTHER PUBLICATIONS

Zhang,"A Flexible New Technique for Camera Calibration", IEEE Transactions on Pattern Analysis and Machine Intelligence, vol. 22, Issue 11, Nov. 11, 2000, pp. 1-21.

(Continued)

*Primary Examiner* — Padma Haliyur
(74) *Attorney, Agent, or Firm* — Paratus Law Group, PLLC

(57) ABSTRACT

There is provided an image processing apparatus and an image processing method capable of robust correction to an image misalignment generated due to an over-time misalignment of a stereo camera. The estimation section estimates at least two parameters out of a pitch angle difference, a yaw angle difference, and a roll angle difference between a left camera and a right camera, and a scale ratio of a left image picked up by the left camera to a right image picked up by the right camera, on basis of a model formula using the parameters. The present disclosure is applicable to, for example, an imaging apparatus that includes a stereo camera configured with the left camera and the right camera and the like.

12 Claims, 19 Drawing Sheets

(51) Int. Cl.
  *G06T 7/73*    (2017.01)
  *G01C 3/06*    (2006.01)
  *H04N 13/20*   (2018.01)
  *G06T 7/33*    (2017.01)
  *G06T 3/00*    (2006.01)

(52) U.S. Cl.
  CPC ............ *G06T 3/0093* (2013.01); *G06T 7/337* (2017.01); *G06T 7/74* (2017.01); *H04N 5/23222* (2013.01); *H04N 13/20* (2018.05); *G06T 2207/10012* (2013.01); *G06T 2207/30244* (2013.01); *G06T 2207/30252* (2013.01)

(56) References Cited

OTHER PUBLICATIONS

Santoro, et al., "Misalignment Correction for Depth Estimation using Stereoscopic 3-D Cameras", 2012 IEEE 14$^{th}$ International Workshop on Multimedia Signal Processing (MMSP), Sep. 17-19, 2012, pp. 19-24, Banff, AB, Canada.

\* cited by examiner

FIG. 16

| | MAIN CAUSES OF OCCURRENCE (EXAMPLE) | | | |
|---|---|---|---|---|
| θ | DISTORTION OF CHASSIS AND SUBSTRATE (EXAMPLE: DEFORMATION DUE TO STRESS APPLIED FROM OUTSIDE OF HOUSING) AND THE LIKE 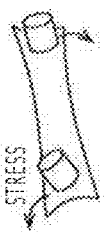 | • LARGE Y MISALIGNMENT IN ENTIRE PICTURE PLANE (MATCHING ERROR) • Y MISALIGNMENT IN DIAGONAL REGION | IN ENTIRE PICTURE PLANE DEPTH EFFECTIVE AREA DECREASES → RECOGNITION ACCURACY GREATLY DEGRADES (HIGH IMPORTANCE LEVEL) | ESTIMATION IS EASILY POSSIBLE IF CERTAIN NUMBER OF MIDPOINTS BETWEEN FEATURE POINTS ARE PRESENT IN ENTIRE PICTURE PLANE |
| φ | WARPAGE AND THE LIKE OF CHASSIS AND SUBSTRATE (EXAMPLE: TEMPERATURE DIFFERENCE IS GENERATED BETWEEN SURFACE AND REAR SURFACE OF SUBSTRATE AND DEFLECTION OCCURS DUE TO HEAT GENERATION IN COMPONENTS MOUNTED ON SUBSTRATE SURFACE)  | • LARGE X MISALIGNMENT (DEPTH ERROR) IN ENTIRE PICTURE PLANE • Y MISALIGNMENT IN DIAGONAL REGION | IN ENTIRE PICTURE PLANE ABSOLUTE DISTANCE ACCURACY DEGRADES → ABSOLUTE DISTANCE ACCURACY IS NECESSARY APPLICATION IS DIFFICULT TO REALIZE | ESTIMATION IS POSSIBLE IF MIDPOINTS BETWEEN FEATURE POINTS ARE PRESENT MAINLY IN DIAGONAL REGION OF PICTURE PLANE HOWEVER, Y MISALIGNMENT AMOUNT IS SMALL COMPARED WITH X MISALIGNMENT AMOUNT, WHILE Y MISALIGNMENT AND X MISALIGNMENT POSSIBLY OCCUR SIMULTANEOUSLY TO FEATURE POINTS, AND ROBUST ESTIMATION IS DIFFICULT |
| α | ROTATION OF LEFT CAMERA AND RIGHT CAMERA ABOUT Z-AXES 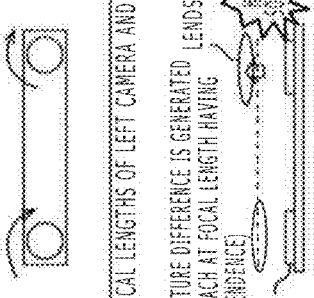 | • X MISALIGNMENT (DEPTH ERROR) FREQUENTLY OCCURS ON UPPER AND LOWER ENDS OF PICTURE PLANE • Y MISALIGNMENT (MATCHING ERROR) FREQUENTLY OCCURS ON LEFT AND RIGHT ENDS OF PICTURE PLANE | ON UPPER AND LOWER ENDS OF SCREEN ABSOLUTE DISTANCE ACCURACY DEGRADES DEPTH EFFECTIVE AREA DECREASES ON LEFT AND RIGHT ENDS OF PICTURE PLANE (HOWEVER, INFLUENCE ON CENTRAL PORTION OF PICTURE PLANE IS SLIGHT) → DEGRADATION OF RECOGNITION ACCURACY AND THE LIKE | ESTIMATION IS POSSIBLE IF MIDPOINTS BETWEEN FEATURE POINTS ARE DISTRIBUTED IN HORIZONTAL DIRECTION |
| λ | VARIATION OF FOCAL LENGTHS OF LEFT CAMERA AND RIGHT CAMERA (EXAMPLE: TEMPERATURE DIFFERENCE IS GENERATED BETWEEN LENSES EACH AT FOCAL LENGTH HAVING TEMPERATURE DEPENDENCE) 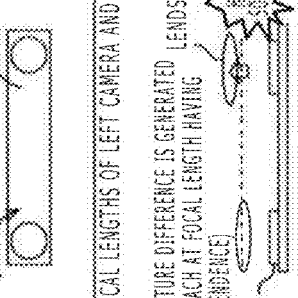 | • X MISALIGNMENT (DEPTH ERROR) FREQUENTLY OCCURS ON LEFT AND RIGHT ENDS OF PICTURE PLANE • Y MISALIGNMENT (MATCHING ERROR) FREQUENTLY OCCURS ON UPPER AND LOWER ENDS OF PICTURE PLANE | ON LEFT AND RIGHT ENDS OF SCREEN ABSOLUTE DISTANCE ACCURACY DEGRADES DEPTH EFFECTIVE AREA DECREASES ON UPPER AND LOWER ENDS OF PICTURE PLANE (HOWEVER, INFLUENCE ON CENTRAL PORTION OF PICTURE PLANE IS SLIGHT) → DEGRADATION OF RECOGNITION ACCURACY AND THE LIKE | ESTIMATION IS POSSIBLE IF MIDPOINTS BETWEEN FEATURE POINTS ARE DISTRIBUTED IN PERPENDICULAR DIRECTION |

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2016/066568 (filed on Jun. 3, 2016) under 35 U.S.C. § 371, which claims priority to Japanese Patent Application No. 2015-122068 (filed on Jun. 17, 2015), which are all hereby incorporated by reference in their entirety.

TECHNICAL FIELD

The present disclosure relates to an image processing apparatus and an image processing method, and particularly relates to an image processing apparatus and an image processing method capable of robust correction to an image misalignment generated due to an over-time misalignment of a stereo camera.

BACKGROUND ART

In recent years, with an improvement of computer performance, there has been proposed that a gesture UI (User Interface) and the like be realized using a depth detected by a stereo camera that picks up images from different points of view by two cameras.

Since a search direction is a horizontal direction only in stereo matching performed during depth detection, the stereo matching is based on the premise of a state of no perpendicular misalignment between left and right cameras (a state in which epipolar lines of the left and right cameras match with each other and are in parallel). Therefore, it is necessary to correct (make a rectification to) a rotational misalignment and the like of the stereo camera in sub-pixel order by an image process.

The rectification needs to use parameters acquired by a calibration of each stereo camera and characteristic of the stereo camera. Examples of a calibration method include, for example, a method of picking up a chart pattern on which a plurality of feature points, among which a positional relationship is known, are printed a plurality of times while changing points of view (see, for example, NPL 1).

However, it is difficult for an inexpensive stereo camera for use as a consumer product or the like to mechanically ensure geometrical position accuracy between the left and right cameras, and the parameters of the stereo camera possibly change with an over-time misalignment thereof.

To address the problem, there has been proposed that a misalignment between left and right images that is possibly generated due to the over-time misalignment of the stereo camera be simply modeled and the misalignment between the left and right images be corrected in accordance with a resultant model (see, for example, PTL 1). The correction method described in PTL 1 can readily correct the misalignment since an angle of view, a resolution, and the like of the stereo camera are unnecessary.

In the present specification, the over-time misalignment of the stereo camera means a variation of the stereo camera from initial calibration time and examples of the over-time misalignment include a deformation due to a force applied to a housing from outside, and a deformation of a material with temperature.

CITATION LIST

Patent Literature

[PTL 1]
JP 2012-177676A

Non Patent Literature

[NPL 1]
Zhengyou Zhang, "A Flexible New Technique for Camera Calibration," IEEE Trans. Pattern Anal. Mach. Intell. (PAMI), 22 (11): 1330-1334, 2000

SUMMARY

Technical Problem

Meanwhile, a dominant cause of the image misalignment generated due to the over-time misalignment is at least one of a pitch angle difference, a yaw angle difference, and a roll angle difference between the and right cameras that are generated due to the over-time misalignment, and a scale ratio of picked-up images.

However, it is difficult for the model that is described in PTL 1 and that does not use these causes as parameters to adaptively change the dominant cause of the image misalignment in response to a probable over-time misalignment or the like. As a result, it is impossible to robustly correct the image misalignment generated due to the over-time misalignment of the stereo camera.

The present disclosure has been achieved in the light of these circumstances, and an object of the present disclosure is to make it possible to robustly correct an image misalignment generated due to an over-time misalignment of a stereo camera.

Solution to Problem

An imaging apparatus according to one aspect of the present disclosure is an image processing apparatus including an estimation section that estimates at least two parameters out of a pitch angle difference, a yaw angle difference, and a roll angle difference between a first imaging section and a second imaging section, and a scale ratio of a first image picked up by the first imaging section to a second image picked up by the second imaging section, on basis of a model formula using the parameters.

An image processing method according to one aspect of the present disclosure corresponds to the image processing apparatus according to the one aspect of the present disclosure.

According to one aspect of the present disclosure, at least two parameters out of a pitch angle difference, a yaw angle difference, and a roll angle difference between a first imaging section and a second imaging section, and a scale ratio of a first image picked up by the first imaging section to a second image picked up by the second imaging section are estimated, on basis of a model formula using the at least two parameters.

It is noted that the image processing apparatus according to the one aspect of the present disclosure can be realized by causing a computer to implement a program.

Furthermore, the program implemented by the computer to realize the image processing apparatus according to the one aspect of the present disclosure can be provided by transmitting the program via a transmission medium or by recording the program in a recording medium.

Advantageous Effects of Invention

According to the one aspect of the present disclosure, it is possible to perform a process on images. It is also possible to robustly correct an image misalignment generated due to an over-time misalignment of a stereo camera according to the one aspect of the present disclosure.

It is noted that effects are not always limited to those described here but may be any of effects described in the present disclosure.

BRIEF DESCRIPTION OF DRAWINGS

FIG. 16 is an explanatory diagram of over-time misalignment parameters.

DESCRIPTION OF EMBODIMENTS

Figure 18:
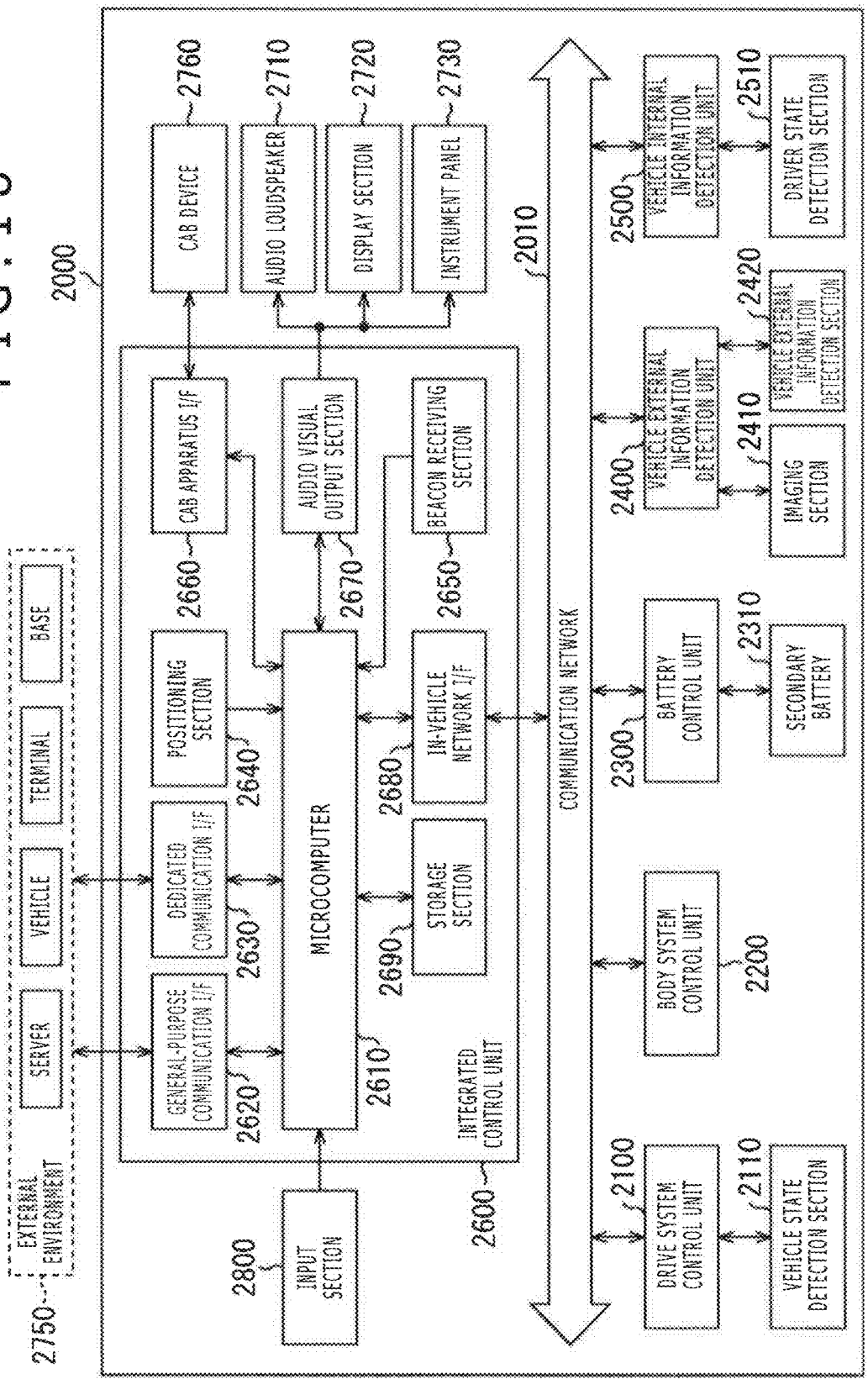
FIG. 18 is a block diagram illustrating one example of a schematic configuration of a vehicle control system.
Figure 19:
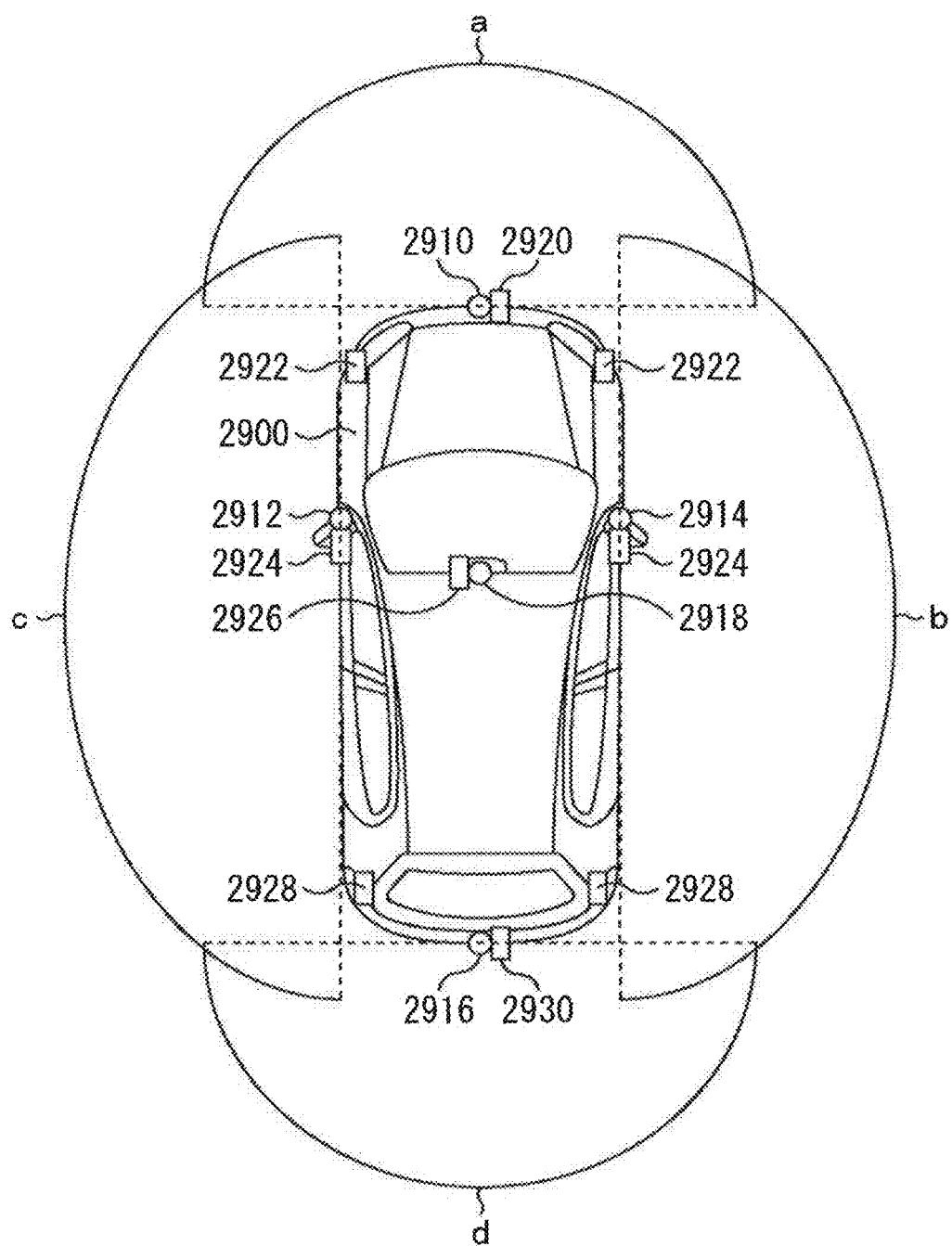
FIG. 19 is an explanatory diagram illustrating one example of installation positions of a vehicle external information detection section and an imaging section.

Modes for carrying out the present disclosure (hereinafter, referred to as "embodiments") will be described hereinafter. It is noted that description will be given in the following order.
1. First embodiment: imaging apparatus (FIGS. 1 to 9)
2. Second embodiment: imaging apparatus (FIGS. 10 to 15)
3. Explanation of over-time misalignment parameters (FIG. 16)
4. Third embodiment: computer (FIG. 17)
5. Fourth embodiment: vehicle control system (FIGS. 18 and 19)

<First Embodiment>
(Example of Configuration of First Embodiment of Imaging Apparatus)

Figure 1:
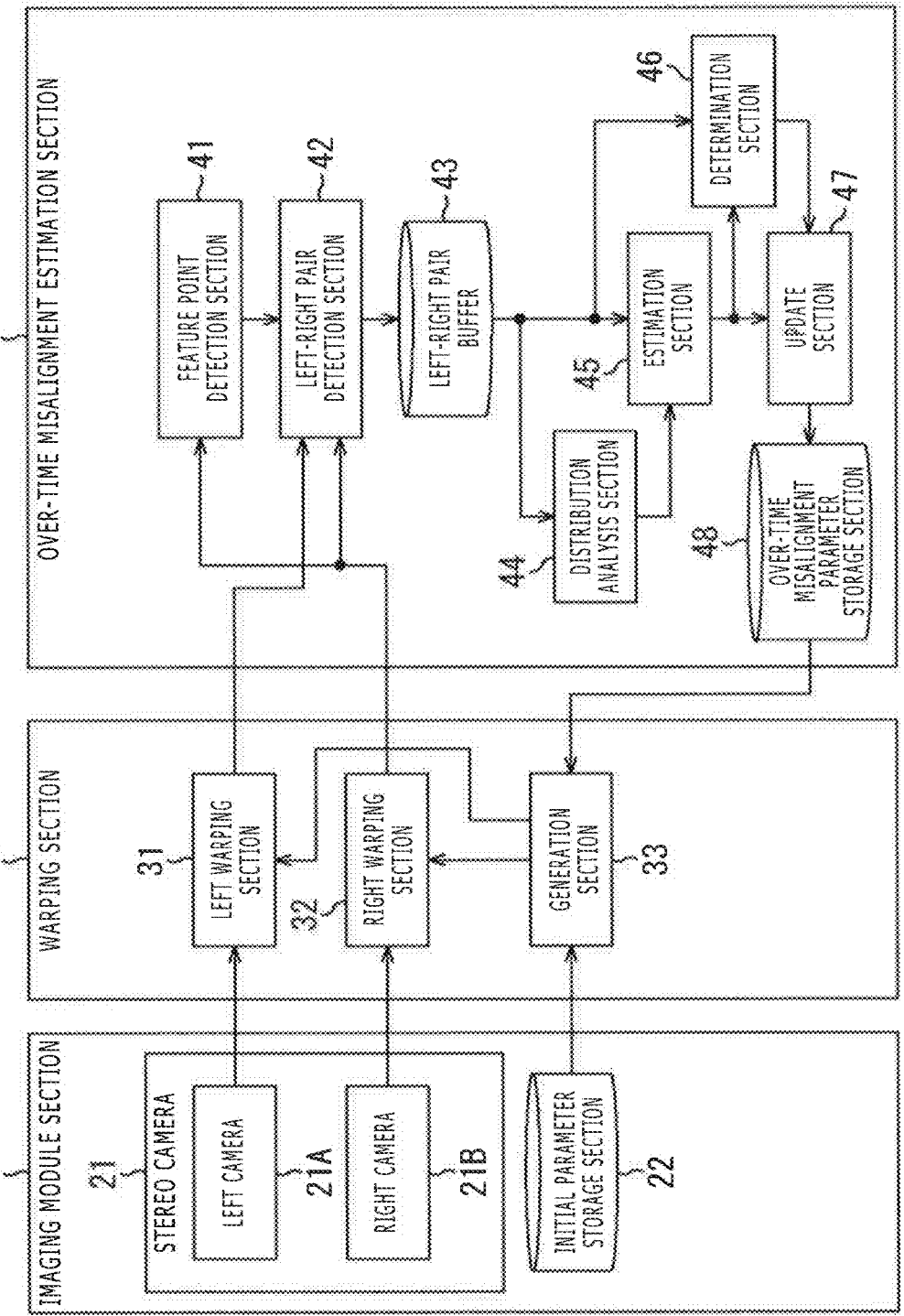
FIG. 1 intends to be capable of robustly correcting an image misalignment generated due to an over-time misalignment of a stereo camera.

FIG. 1 is a block diagram illustrating an example of a configuration of a first embodiment of an imaging apparatus to which the present disclosure is applied.

An imaging apparatus 10 of FIG. 1 is configured with an imaging module section 11, a warping section 12, and an over-time misalignment estimation section 13, and picks up images from two points of view.

FIG. 1 is the block diagram illustrating an example of the configuration of the first embodiment of the imaging apparatus to which the present disclosure is applied.

The imaging module section 11 of the imaging apparatus 10 is configured with a stereo camera 21 and an initial parameter storage section 22.

The stereo camera 21 is configured with a left camera 21A disposed on the subject's left hand, and a right camera 21B disposed on the subject's right hand. The left camera 21A and the right camera 21B image a same subject from different points of view and obtain picked-up images. The picked-up image picked up by the left camera 21A (hereinafter, referred to as "left image") and the picked-up image picked up by the right camera 21B (hereinafter, referred to as "right image" are supplied to the warping section 12.

The initial parameter storage section 22 stores parameters of the stereo camera 21 acquired by a calibration as initial parameters. The initial parameters are configured with internal parameters representing lens distorted shapes of the left camera 21A and the right camera 21B and the like, and external parameters representing a geometrical position relationship between the left camera 21A and the right camera 21B and the like.

While a calibration method and the initial parameters are not limited to specific ones, those described in, for example, NPL 1 can be adopted.

The warping section 12 is configured with a left warping section 31, a right warping section 32, and a generation section 33.

The left warping section 31 performs a rectification to the left image. Specifically, the left warping section 31 sets each pixel within the left image as a pixel of interest in sequence. The left warping section 31 performs warping on the pixel of interest by setting, as the pixel of interest, a pixel on before-warping coordinates of each pixel of interest within the left image supplied from the generation section 33 with respect to the left image supplied from the left camera 21A. The left warping section 31 supplies and outputs an image obtained as a result of the warping on all of the pixels within the left image to the over-time misalignment estimation section 13 as an after-rectification left image.

Similarly to the left warping section 31, the right warping section 32 performs a rectification to the right image supplied from the right camera 21B on the basis of before-warping coordinates of each pixel of interest within the right image supplied from the generation section 33. The right warping section 32 supplies and outputs an after-rectification right image to the over-time misalignment estimation section 13.

The generation section 33 reads out the initial parameters from the initial parameter storage section 22. Further, the generation section 33 reads out over-time misalignment parameters for use in a model formula that represents a misalignment between the left image and the right image due to an over-time misalignment of the stereo camera 21 (hereinafter, referred to as "over-time misalignment model formula") from the over-time misalignment estimation section 13.

The over-time misalignment parameters include a pitch angle difference, a yaw angle difference, and a roll angle difference between the left camera 21A (first imaging section) and the right camera 21B (second imaging section), and a scale ratio of the left image to the right image, each of which possibly becomes a dominant cause of the misalignment between the left and right images generated due to the over-time misalignment. The pitch angle difference, the yaw angle difference, the roll angle difference, and the scale ratio will be referred to as "parameters" hereinafter if there is no need to particularly distinguish the differences and the ratio.

The generation section 33 computes before-warping coordinates of each pixel of interest within the left image and before-warping coordinates of each pixel of interest within the right image on the basis of the initial parameters and the over-time misalignment parameters. The generation section 33 supplies the before-warping coordinates of the pixel of interest within the left image to the left warping section 31, and supplies the before-warping coordinates of the pixel of interest within the right image to the right warping section 32. As a result, it is possible to correct (make a rectification to) the misalignment between the left image and the right image in a horizontal direction and a perpendicular direction due to lens distortions of the left camera 21A and the right camera 21B, a geometrical position misalignment between the left camera 21A and the right camera 21B, or the like.

The over-time misalignment estimation section 13 is configured with a feature point detection section 41, a left-right pair detection section 42, a left-right pair buffer 43, a distribution analysis section 44, an estimation section 45, a determination section 46, an update section 47, and an over-time misalignment parameter storage section 48.

The feature point detection section 41 detects, as feature points, corners of a pattern in which the right image and the left image can be easily made to correspond to each other from the after-rectification right image supplied from the right warping section 32. Detection by the feature point detection section 41 can be performed by using, for example, Harris Corner Detection. The Harris corner detection is described in, for example, C. Harris, M. J. Stephens, "A combined corner and edge detector," in Alvey Vision Conference, pp. 147-152, 1988.

The feature point detection section 41 supplies coordinates of each of the detected feature points to the left-right pair detection section 42. It is noted that the feature point detection section 41 may detect the coordinates of each feature point from the after-rectification left image supplied from the left warping section 31, and supply the coordinates of the feature point to the left-right pair detection section 42.

The left-right pair detection section 42 performs block matching or the like between the after-rectification right image from the right warping section 32 and the after-rectification left image from the left warping section 31 on the basis of the coordinates of each feature point supplied from the feature point detection section 41. The left-right pair detection section 42 (detection section) thereby detects coordinates of a point within the after-rectification left image corresponding to each feature point within the after rectification right image.

Accuracy of the detected coordinates is, for example, sub-pixel accuracy identical to accuracy of stereo matching performed using the left image and the right image. The left right pair detection section 42 supplies, for each feature point, pairs of the coordinates of the feature point within the after-rectification right image and the coordinates of the point within the after-rectification left image, the point corresponding to the feature point, to the left-right pair buffer 43 as left and right pair coordinates.

The left-right pair buffer 43 holds the left and right pair coordinates of the feature points supplied from the left-right pair detection section 42.

The distribution analysis section 44 reads out the left and right pair coordinates of the feature points from the left-right pair buffer 43. The distribution analysis section 44 computes coordinates of a midpoint between the left and right pair coordinates of the feature points on the basis of the left and right pair coordinates of the feature points. The distribution analysis section 44 determines (selects) a to-be-estimated parameter out of the over-time misalignment parameters as an estimation parameter on the basis of a spatial distribution of the coordinates of the midpoints between the left and right pair coordinates of the feature points, and supplies the estimation parameter to the estimation section 45.

The estimation section 45 reads out the left and right pair coordinates of the feature points from the left-right pair buffer 43. The estimation section 45 determines a formula obtained by deleting members of the parameters other than the estimation parameter supplied from the distribution analysis section 44 from a perpendicular over-time misalignment model formula as an estimation formula for estimating the misalignment in the perpendicular direction.

The estimation section 45 estimates the estimation parameter for use in the estimation formula on the basis of the left and right pair coordinates of the feature points and the estimation formula in such a manner as to make smallest a difference between a measured value of the perpendicular misalignment that is a difference between the left and right pair coordinates of the feature points in the perpendicular direction and an estimated value of the perpendicular misalignment calculated by the estimation formula. The estimation section 45 supplies the estimation formula into which the estimated estimation parameter is substituted to the determination section 46, and supplies the estimation parameter to the update section 47.

The determination section 46 reads out the left and right pair coordinates of the feature points from the left-right pair buffer 43. The determination section 46 calculates a statistic of a residual between the perpendicular difference between the left and right pair coordinates of the feature points and the perpendicular misalignment estimated from the estimation formula on the basis of the left and right pair coordinates of the feature points and the estimation formula supplied from the estimation section 45. The determination section 46 performs verification for determining whether the estimation parameter is valid on the basis of the calculated statistic. The determination section 46 supplies a verification result to the update section 47.

The update section 47 supplies the estimation parameter supplied from the estimation section 45 to the over-time misalignment parameter storage section 48 on the basis of the verification result supplied from the determination section 46 to store the estimation parameter therein, thereby updating the estimation parameter.

The over-time misalignment parameter storage section 48 stores the estimation parameter supplied from the update section 47.

It is noted that the imaging apparatus 10 may be configured such that the determination section 46 is not provided and the estimation parameter is updated whenever the estimation parameter is estimated.
(Example of Exterior Configuration of Stereo Camera)
FIG. 2 is a perspective view illustrating an example of an exterior configuration of the stereo camera 21 of FIG. 1.

Figure 2:
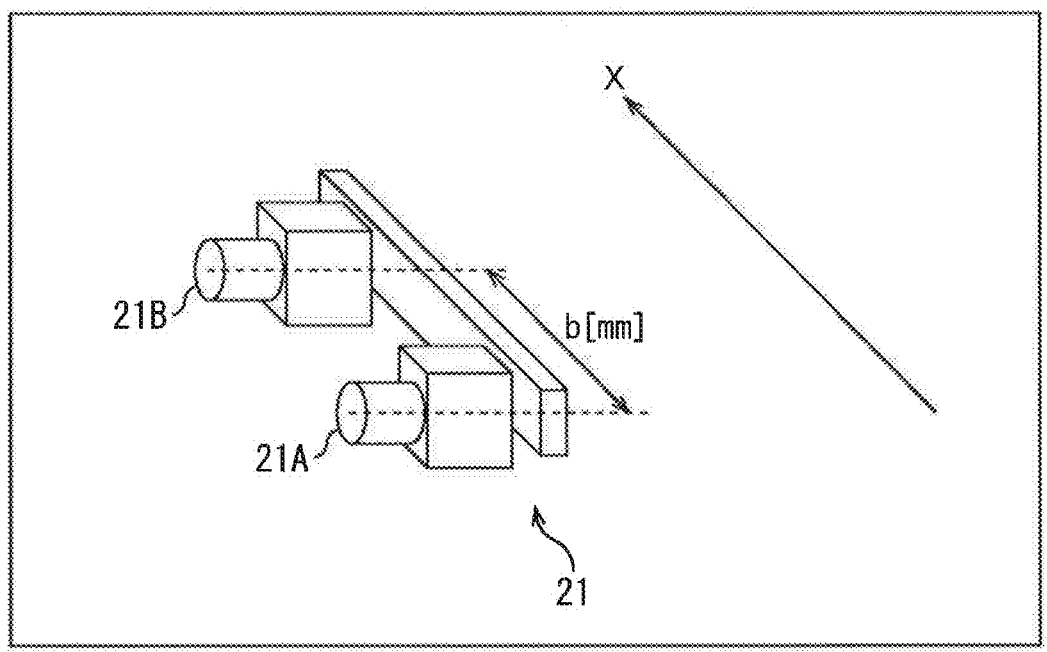
FIG. 2 is a perspective view illustrating an example of an exterior configuration of the stereo camera of FIG. 1.
Figure 3:
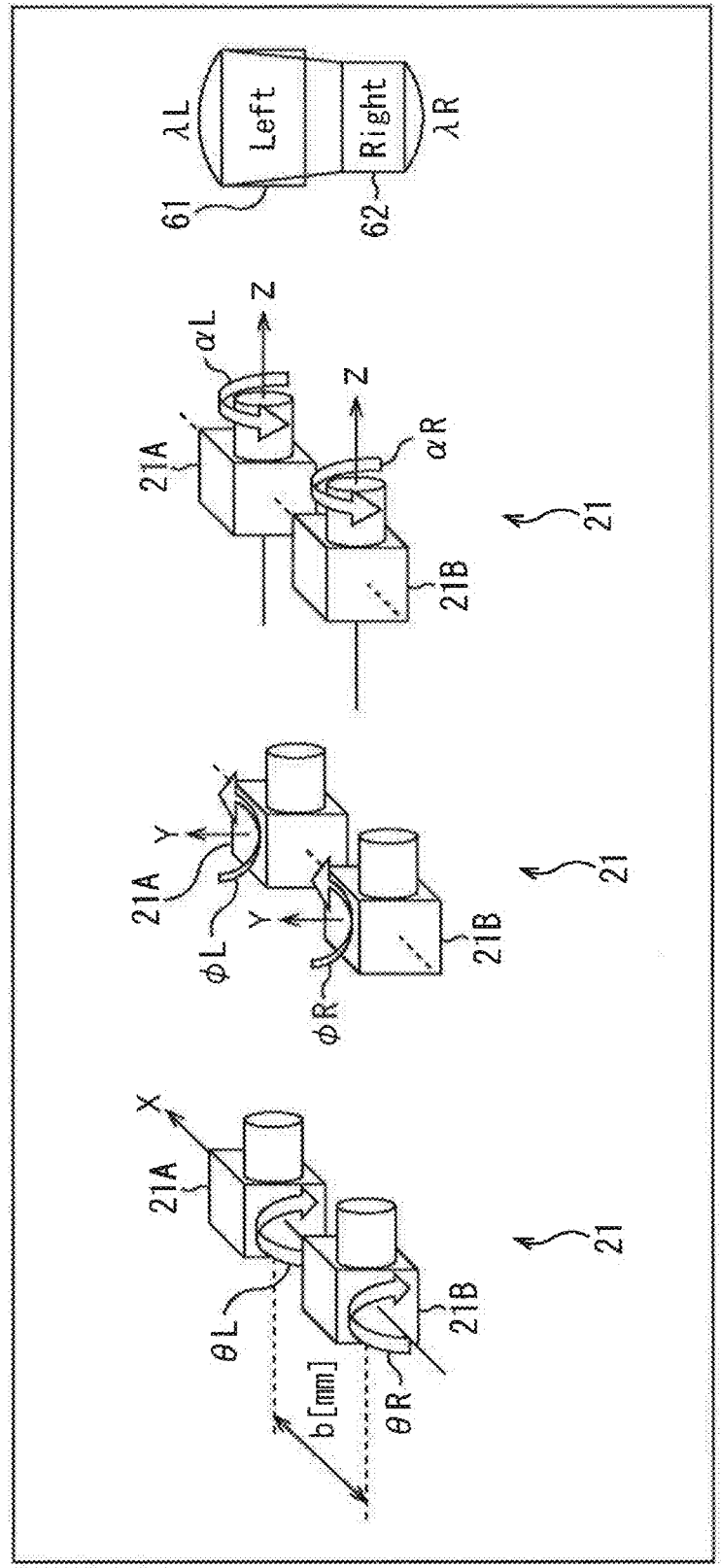
FIG. 3 is an explanatory diagram of over-time misalignment parameters.

As depicted in FIG. 2, the left camera 21A and the right camera 21B of the stereo camera 21 are disposed side by side in the horizontal direction (X direction). In the example of FIG. 2, a base length (base line) b between the left camera 21A and the right camera 21B of the stereo camera 21 is 80 [mm].
(Explanation of Over-time Misalignment Parameters)
FIG. 3 is an explanatory diagram of the over-time misalignment parameters.

The pitch angle difference θ [rad], the yaw angle difference φ [rad], the roll angle difference α [rad], and the scale ratio λ configuring the over-time misalignment parameters are represented by the following Formula (1).

[Formula 1]

$$\theta = \theta L - \theta R$$
$$\phi = \phi L - \phi R$$
$$\alpha = \alpha L - \alpha R$$
$$\lambda = \frac{\lambda L}{\lambda R}$$

(1)

As depicted in FIG. 3, θL and θR denote pitch angles that are angles of the left camera 21A and the right camera 21B in a direction of rotation about an X-axis which is an axis in the horizontal direction, respectively. φL and φR denote yaw angles that are angles of the left camera 21A and the right camera 21B in the direction of rotation about a Y-axis which is an axis in the perpendicular direction, respectively.

Furthermore, αL and αR denote roll angles that are angles of the left camera 21A and the right camera 21B in the direction of rotation about a Z-axis which is an axis in an optical axis direction, respectively. λL and denote sizes of a left image 61 and a right image 62 in the horizontal direction, respectively. It is noted that the λL and λR may be sizes of the left image 61 and the right image 62 in the perpendicular direction, respectively.

Figure 4:
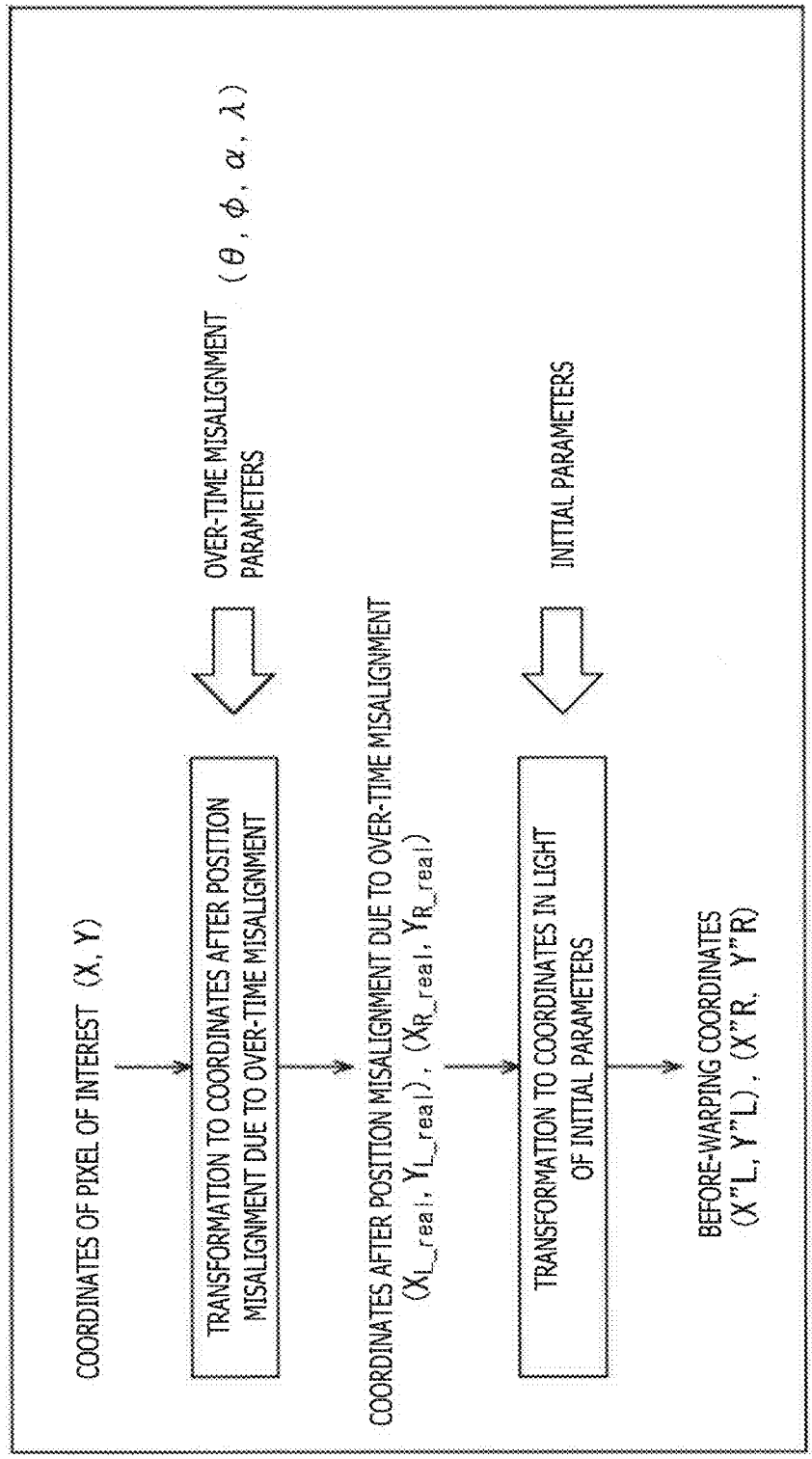
FIG. 4 is an explanatory diagram of a method of computing before-warping coordinates.

The pitch angle difference θ [rad], the yaw angle difference φ [rad], and the roll angle difference α [rad] generate a misalignment between the directions of the points of view. Furthermore, the scale ratio λ results from a misalignment in a focal length of the left camera 21A and the right camera 21B, and the like.
(Explanation of Method of Computing Before-warping Coordinates)
FIG. 4 is an explanatory diagram of a method of computing the before-warping coordinates by the generation section 33 of FIG. 1.

If the over-time misalignment parameters are small, a horizontal misalignment amount Δx and a perpendicular misalignment amount ΔY between the left image and the right image generated due to the over-time misalignment of the stereo camera 21 on certain coordinates (X, Y) can be approximated by the following Formula (2). Therefore, the imaging apparatus 10 adopts the Formula (2) as an over-time misalignment model formula.

[Formula 2]

$$\Delta X = (-XY)\theta + (X^2+1)\phi + (-Y)\alpha + (X)\lambda$$ (2)

$$\Delta Y = -(Y^2+1)\theta + (XY)\phi - (X)\alpha + (Y)\lambda$$

Here, when a coordinate system is one in which a center of an image is (0,0) and the left camera 21A and the right camera 21B are each a pinhole camera having a focal length f of 1.0, coordinates ($X_{L\_real}$, $Y_{L\_real}$) within the left image and coordinates ($X_{R\_real}$, $Y_{R\_real}$) within the right image as a result of generation of the misalignment amounts ΔX and ΔY on the coordinates (X, Y) are represented by the following Formula (3).

[Formula 3]

$$X_{L\_real} \cong X + \frac{\Delta X}{2}$$ (3)
$$X_{R\_real} \cong X - \frac{\Delta X}{2}$$
$$Y_{L\_real} \cong Y + \frac{\Delta Y}{2}$$
$$Y_{R\_real} \cong Y - \frac{\Delta Y}{2}$$

Therefore, the generation section 33 computes first the coordinates ($X_{L\_real}$, $Y_{L\_real}$) of the pixel of interest within the left image and the coordinates ($X_{R\_real}$, $Y_{R\_real}$) of the pixel of interest within the right image after a position misalignment due to the over-time misalignment of the stereo camera 21 on the basis of the coordinates (X,Y) of the pixels of interest within the left image and the right image.

Specifically, the generation section 33 computes the horizontal misalignment amount ΔX and the perpendicular misalignment amount ΔY with respect to the pixels of interest by the above Formula (2). At this time, the parameters not held in the over-time misalignment parameter storage section 48 among the over-time misalignment parameters are set to zero. The generation section 33 then computes the coordinates ($X_{L\_real}$, $Y_{L\_real}$) and the coordinates ($X_{R\_real}$, $Y_{R\_real}$) by the above Formula (3) on the basis of the misalignment amounts ΔX and ΔY.

Next, the generation section 33 computes before-warping coordinates (X"L,Y"L), (X"R,Y"R), into which the coordinates ($X_{L\_real}$, $Y_{L\_real}$) and the coordinates ($X_{R\_real}$, $Y_{R\_real}$) are transformed, on the basis of the initial parameters in accordance with the method described in NPL 1 or the like.
(Example of Left and Right Pair Coordinates)
FIG. 5 illustrates examples of the left and right pair coordinates.

Figure 5:
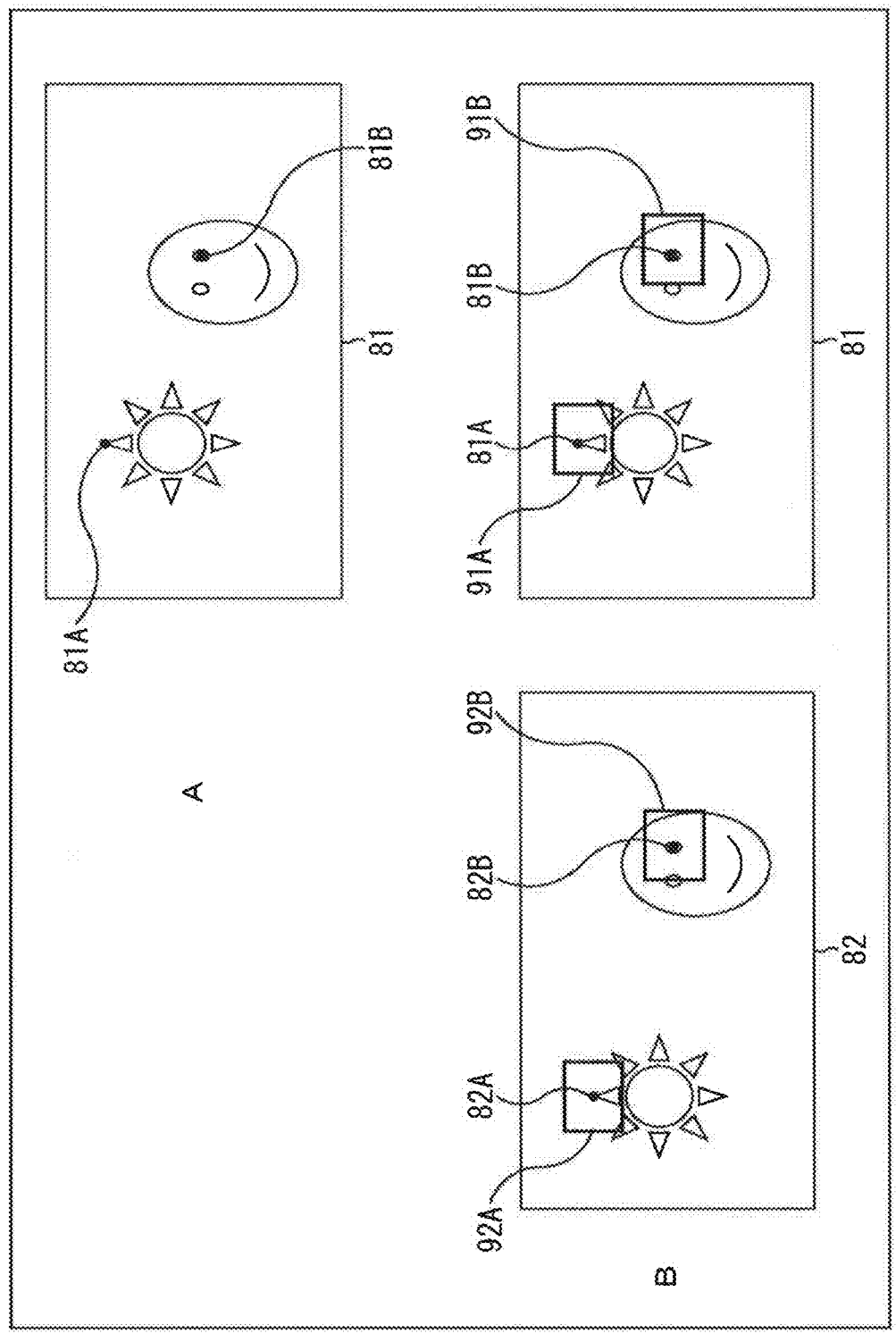
FIG. 5 illustrates examples of left and right pair coordinates.

As depicted in A of FIG. 5, the feature point detection section 41 detects, for example, feature points 81A and 81B from a right image 81. The feature point detection section 41 then supplies coordinates ($XR_1$, $YR_1$) of the feature point 81A and coordinates ($XR_2$, $YR_2$) of the feature point 81B to the left-right pair detection section 42.

As depicted in B of FIG. 5, the left-right pair detection section 42 performs block matching between a block 91A centering around the feature point 81A on the coordinates ($XR_1$, $YR_1$) within the right image 81 and the left image 82. The left-right pair detection section 42 determines a pair of coordinates ($XL_1$, $YL_1$) of a center 82A in a block 92A within the left image 82 that has a highest correlation to the block 91A and the coordinates ($XR_1$, $YR_1$) of the feature point 81A as left and right pair coordinates.

Likewise, the left-right pair detection section 42 performs block matching between a block 91B centering around the feature point 81B on the coordinates ($XR_2$,$YR_2$) within the right image 81 and the left image 82. The left-right pair detection section 42 determines a pair of coordinates ($XL_2$, $YL_2$) of a center 82B in a block 92B within the left image 82 that has a highest correlation to the block 91B and the coordinates $(XR_2, YR_2)$ of the feature point 81B as left and right pair coordinates.

(Estimation Parameter Determination Method)

Figure 6:
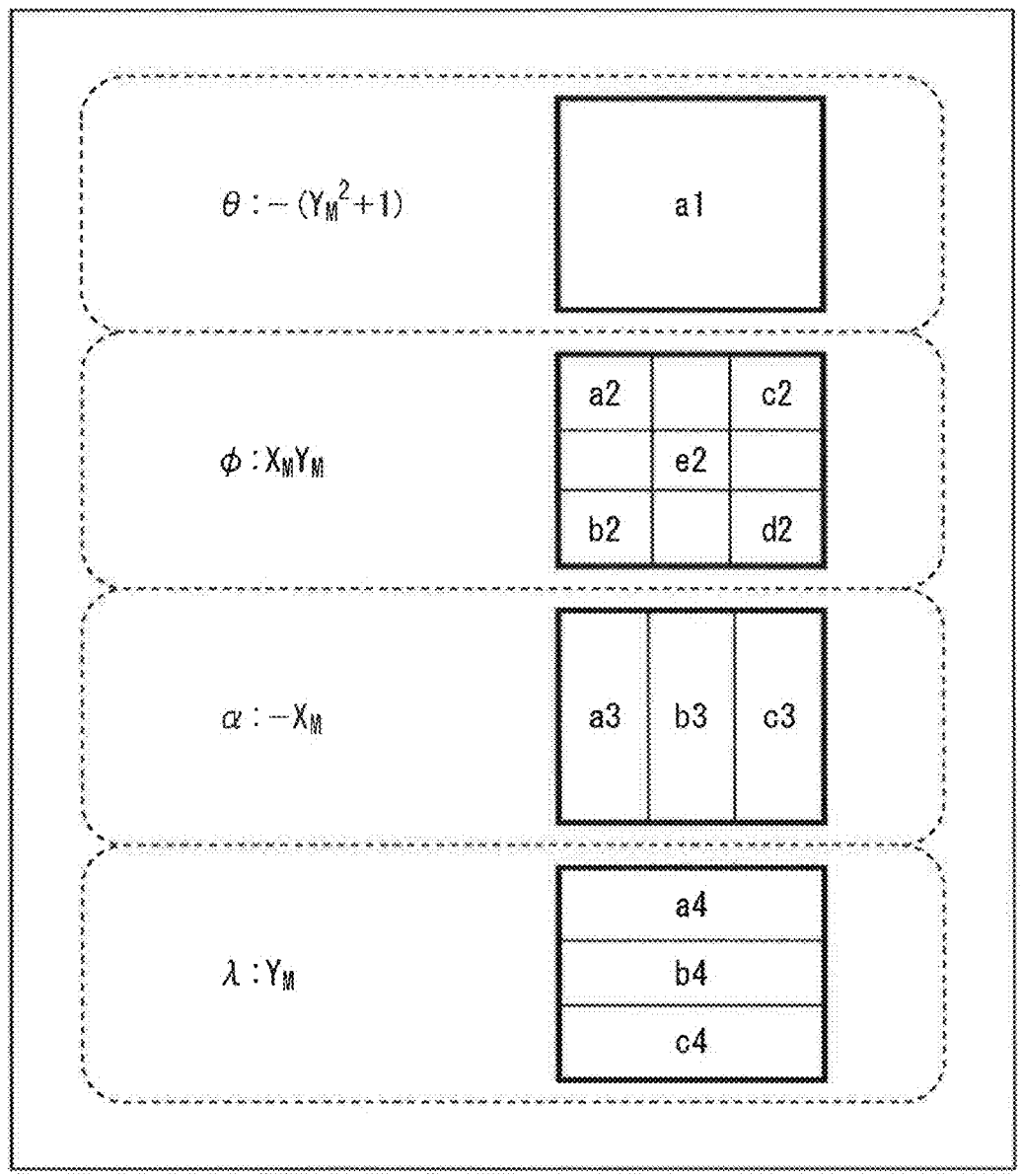
FIG. 6 is an explanatory diagram of an estimation parameter determination method.

FIG. 6 is an explanatory diagram of an estimation parameter determination method by the distribution analysis section 44 of FIG. 1.

As described above, the imaging apparatus 10 adopts the above Formula (2) as the over-time misalignment model formula. Therefore, the estimation section 45 basically uses the formula that defines the misalignment amount ΔY which is the perpendicular over-time misalignment model formula in the Formula (2) as the estimation formula, and estimates the over-time misalignment parameter for use in the estimation formula in such a manner as to make smallest a difference between the misalignment amount ΔY estimated by the estimation formula and a measured value of the misalignment amount ΔY.

Specifically the estimation section 45 uses, as the measured value of the misalignment amount ΔY, a perpendicular difference between coordinates $(X_L, Y_L)$ of the left image and coordinates $(X_R, Y_R)$ of the right image that constitute the left and right pair coordinates of the feature points. Furthermore, the estimation section 45 determines coordinates $(X_M, Y_M)$ of a midpoint between the coordinates $(X_L, Y_L)$ of the left image and the coordinates $(X_R, Y_R)$ of the right image by the following Formula (4).

[Formula 4]

$$X_M = \frac{X_L + X_R}{2}, Y_M = \frac{Y_L + Y_R}{2} \quad (4)$$

Moreover, the estimation section 45 defines, as an evaluation function by the following Formula (5), a sum of squares of an error E between the misalignment amount ΔY with respect to the coordinates $(X_M, Y_M)$ of the midpoint estimated by the estimation formula and the measured value of the misalignment amount ΔY based on the formula defining the misalignment amount ΔY m the Formula (2).

[Formula 5]

$$E = \Sigma((Y_L - Y_R) - (-(Y_M^2+1)\theta + (X_M Y_M)\phi - (X_M)\alpha + (Y_M)\lambda))^2 \quad (5)$$

The estimation section 45 then estimates the over-time misalignment parameter that makes the smallest the sum of squares of the error using an ordinary nonlinear minimization scheme such as Levenberg-Marquardt Method.

However, as depicted in FIG. 6, in Formula (5), a coefficient of the difference θ is $-(Y_M^2+1)$, a coefficient of the difference φ is $X_M Y_M$, a coefficient of the difference α is $-X_M$, and a coefficient of the scale ratio λ is $Y_M$.

Owing to this, the distribution analysis section 44 determines that the difference θ can be estimated with sufficient accuracy and determines the difference θ as the estimation parameter only if coordinates $(X_M, Y_M)$ of a predetermined number or more of midpoints are distributed in an entire region a1 of a picture plane, that is, only if the number of feature points is equal to or greater than the predetermined number.

Furthermore, the distribution analysis section 44 determines that the difference φ can be estimated with sufficient accuracy and determines the difference φ as the estimation parameter only if coordinates $(X_M, Y_M)$ of the predetermined number or more of midpoints are distributed in an upper left region a2, a lower left region b2, an upper right region c2, a lower right region d2, and a central region e2 when the picture plane is divided into 3×3 regions.

Moreover, the distribution analysis section 44 determines that the difference α can be estimated with sufficient accuracy and determines the difference α as the estimation parameter only if coordinates $(X_M, Y_M)$ of the predetermined number or more of midpoints are distributed in regions a3 to c3 obtained by dividing the picture plane into a plurality of (three in the example of FIG. 6) regions in the horizontal direction.

Furthermore, the distribution analysis section 44 determines that the scale ratio λ can be estimated with sufficient accuracy and determines the scale ratio λ as the estimation parameter only if coordinates $(X_M, Y_M)$ of the predetermined number or more of midpoints are distributed in regions a4 to c4 obtained by dividing the picture plane into a plurality of (three in the example of FIG. 6) regions in the perpendicular direction.

The members of the parameters other than the estimation parameter among the over-time misalignment parameters are deleted from the estimation formula. Owing to this, the parameters other than the estimation parameter among the over-time misalignment parameters are not estimated.

For example, if only the difference θ and the scale ratio λ are determined as the estimation parameters, the estimation section 45 estimates only the difference θ and the scale ratio λ in such a manner as to make the smallest a sum of squares of the error $E_a$ defined by the following Formula (6).

[Formula 6]

$$E_a = \Sigma((Y_L - Y_R) - (-(Y_M^2+1)\theta + (Y_M)\lambda))^2 \quad (6)$$

For example, if only the difference θ is determined as the estimation parameter, the estimation section 45 estimates only the difference θ in such a manner as to make the smallest a sum of squares of the error $E_b$ defined by the following Formula (7).

[Formula 7]

$$E_b = \Sigma((Y_L - Y_R) - (-(Y_M^2+1)\theta))^2 \quad (7)$$

(Explanation of Verification)

Figure 7:
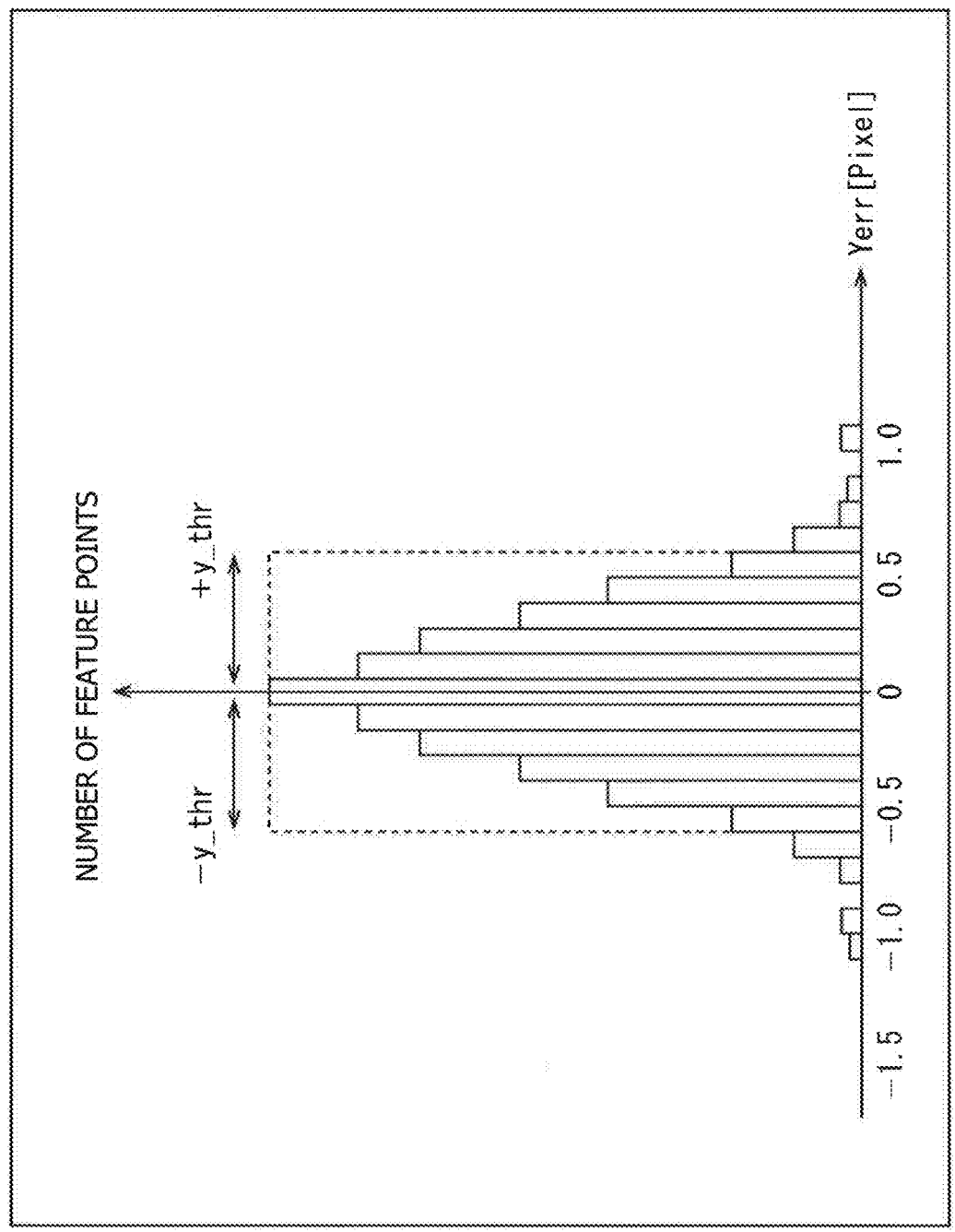
FIG. 7 is an explanatory diagram of verification.

FIG. 7 is an explanatory diagram of verification by the determination section 46 of FIG. 1.

A graph of FIG. 7 is a histogram with a horizontal axis representing a residual Yerr [Pixel] and a vertical axis representing the number of feature points.

For example, if all of the over-time misalignment parameters are determined as the estimation parameters, the residual Yerr is represented by the following Formula (6).

[Formula 8]

$$Yerr = (Y_L - Y_R) - (-(Y_M^2+1)\theta + (X_M Y_M)\phi - (X_M)\alpha + (Y_M)\lambda) \quad (8)$$

The determination section 46 determines the residual Yerr of the feature points and calculates the number of feature points corresponding to each residual Yerr as a statistic, thereby generating the histogram of FIG. 7. In addition, the determination section 46 determines the number of feature points count_valid the residuals Yerr of which are present in a range which is defined as a valid range in advance and in which absolute values are equal to or smaller than y_thr (for example, 0.5).

The determination section 46 generates a verification result indicating that the estimation parameter is valid if a ratio of the number of feature points count_valid to a total number of feature points count_total is equal to or higher than a predetermined valid pair ratio valid_ratio (for example, 0.8). On the other hand, the determination section 46 generates a verification result indicating that the estimation parameter is not valid if the ratio of the number of feature points count_valid to the total number of feature points count_total is lower than the predetermined valid pair ratio valid ratio.

(Explanation of Process By Imaging Apparatus)

Figure 8:
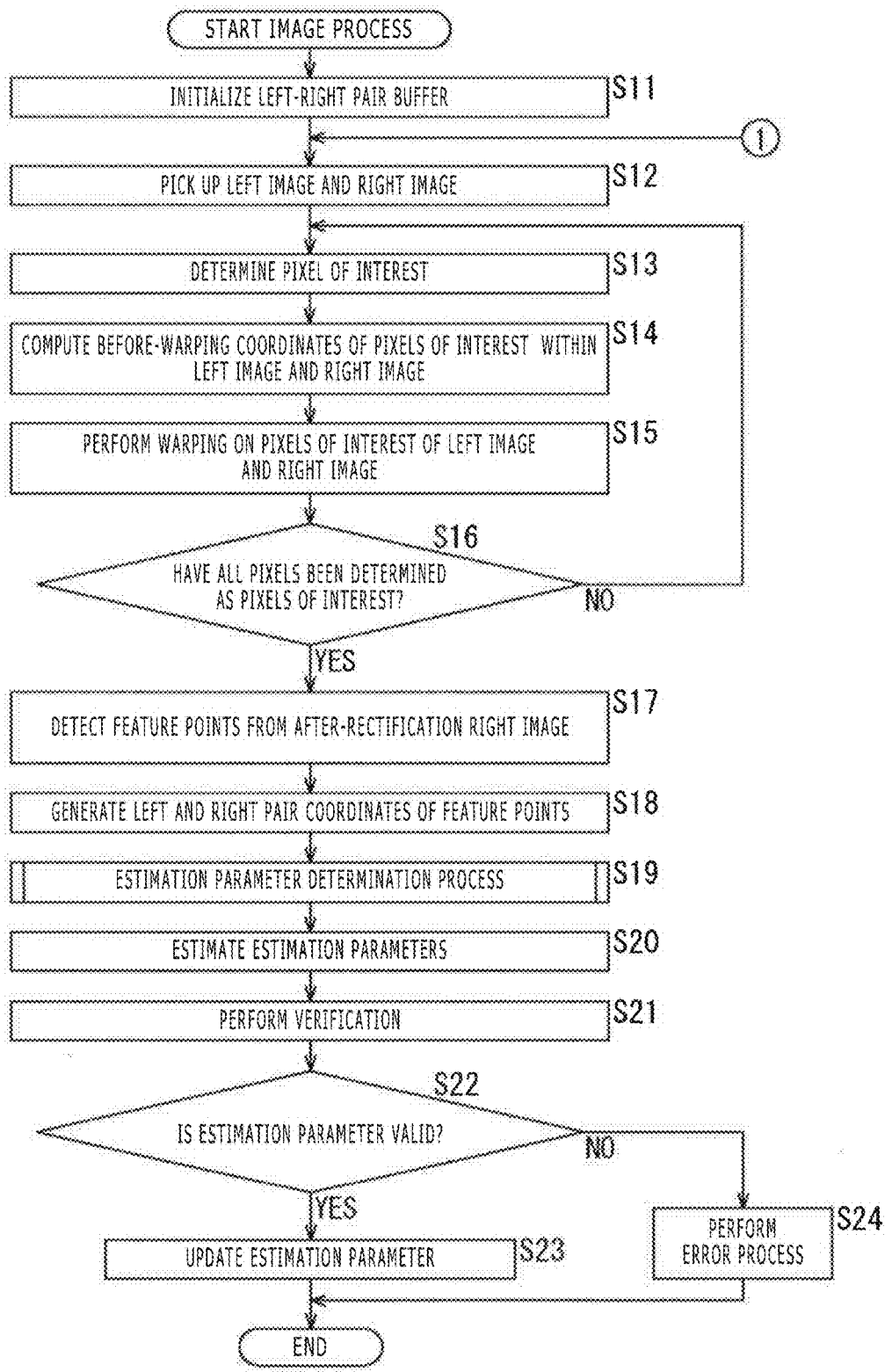
FIG. 8 is a flowchart explaining an image process by an imaging apparatus of FIG. 1.

FIG. 8 is a flowchart explaining an image process by the imaging apparatus 10 of FIG. 1.

In Step S11 of FIG. 8, the imaging apparatus 10 initializes the left-right pair buffer 43. The left-right pair buffer 43 thereby deletes the left and right pair coordinates held therein.

In Step S12, the left camera 21A of the stereo camera 21 picks up a left image, and the right camera 21B picks up a right image. The left image is supplied to the left warping section 31, and the right image is supplied to the right warping section 32.

In Step S13, the left warping section 31 determines a pixel, which is not determined yet as a pixel of interest, out of pixels constituting the left image as a pixel of interest within the left image. Furthermore, the right warping section 32 determines a pixel, which is identical in a position to the pixel of interest within the left image, out of pixels constituting the right image as a pixel of interest within the right image.

In Step S14, the generation section 33 computes before-warping coordinates of the pixels of interest within the left image and the right image on the basis of the initial parameters read out from the initial parameter storage section 22 and the over-time misalignment parameters read out from the over-time misalignment parameter storage section 48. The generation section 33 supplies the before-warping coordinates of the pixel of interest within the left image to the left warping section 31, and supplies the before-warping coordinates of the pixel of interest within the right image to the right warping section 32.

In Step S15, the left warping section 31 performs warping on the pixel of interest by setting, as the pixel of interest, a pixel on the before-warping coordinates of the pixel of interest within the left image supplied from the generation section 33 with respect to the left image supplied from the left camera 21A. In addition, the right warping section 32 performs warping on the pixel of interest by setting, as the pixel of interest, a pixel on the before-warping coordinates of the pixel of interest within the right image supplied from the generation section 33 with respect to the right image supplied from the right camera 21B.

In Step S16, the left warping section 31 determines whether all of the pixels within the left image have been determined as pixels of interest. When it is determined in Step S16 that all of the pixels within the left image have not been determined yet as the pixels of interest, the process returns to Step S13 and processes from Step S13 to S16 are repeated until all of the pixels within the left image have been determined as the pixels of interest.

On the other hand, when it is determined in Step S16 that all of the pixels within the left image have been determined as the pixels of interest, the left warping section 31 supplies an image obtained as a result of the warping on all of the pixels within the left image to the left-right pair detection section 42 as an after-rectification left image. Furthermore, the right warping section 32 supplies an image obtained as a result of the warping on all of the pixels within the right image to the feature point detection section 41 and the left-right pair detection section 42 as an after-rectification right image.

In Step S17, the feature point detection section 41 detects feature points from the after-rectification right image supplied from the right warping section 32. The feature point detection section 41 supplies coordinates of each of the feature points detected from the after-rectification right image to the left-right pair detection section 42

In Step S18, the left-right pair detection section 42 generates left and right pair coordinates of the feature points by performing block matching or the like between the after-rectification right image and the after-rectification left image on the basis of the coordinates of the feature points. The left and right pair coordinates of the feature points are supplied to and held in the left-right pair buffer 43.

In Step S19, the distribution analysis section 44 performs an estimation parameter determination process for determining the estimation parameter on the basis of a distribution of the left and right pair coordinates of the feature points held in the left-right pair buffer 43. This estimation parameter determination process will be described in detail with reference to FIG. 9 to be referred to later on.

In Step S20, the estimation section 45 estimates the estimation parameter on the basis of the estimation formula obtained by deleting the members of the parameters other than the estimation parameter from the perpendicular over-time misalignment model formula and the left and right pair coordinates of the feature points held in the left-right pair buffer 43. The estimation section 45 supplies the estimation formula into which the estimated estimation parameter is substituted to the determination section 46, and supplies the estimation parameter to the update section 47.

In Step S21, the determination section 46 generates the histogram of the residuals on the basis of the left and right pair coordinates of the feature points held in the left-right pair buffer 43 and the estimation formula supplied from the estimation section 45, and performs verification based on the histogram of the residuals. The determination section 46 supplies a verification result to the update section 47.

In Step S22, the update section 47 determines whether the estimation parameter is valid, that is, the verification result indicates that the estimation parameter is valid on the basis of the verification result supplied from the determination section 46.

When determining in Step S22 that the estimation parameter is valid, the update section 47 supplies, in Step S23, the estimation parameter supplied from the estimation section 45 to the over-time misalignment parameter storage section 48 to store the estimation parameter therein, thereby updating the estimation parameter. The imaging apparatus 10 then ends the process.

On the other hand, when it is determined in Step S23 that the estimation parameter is not valid, the imaging apparatus 10 notifies, in Step S24, a user that the rectification has not been performed successfully, performs an error process such as a request of retry, and ends the process.

Figure 9:
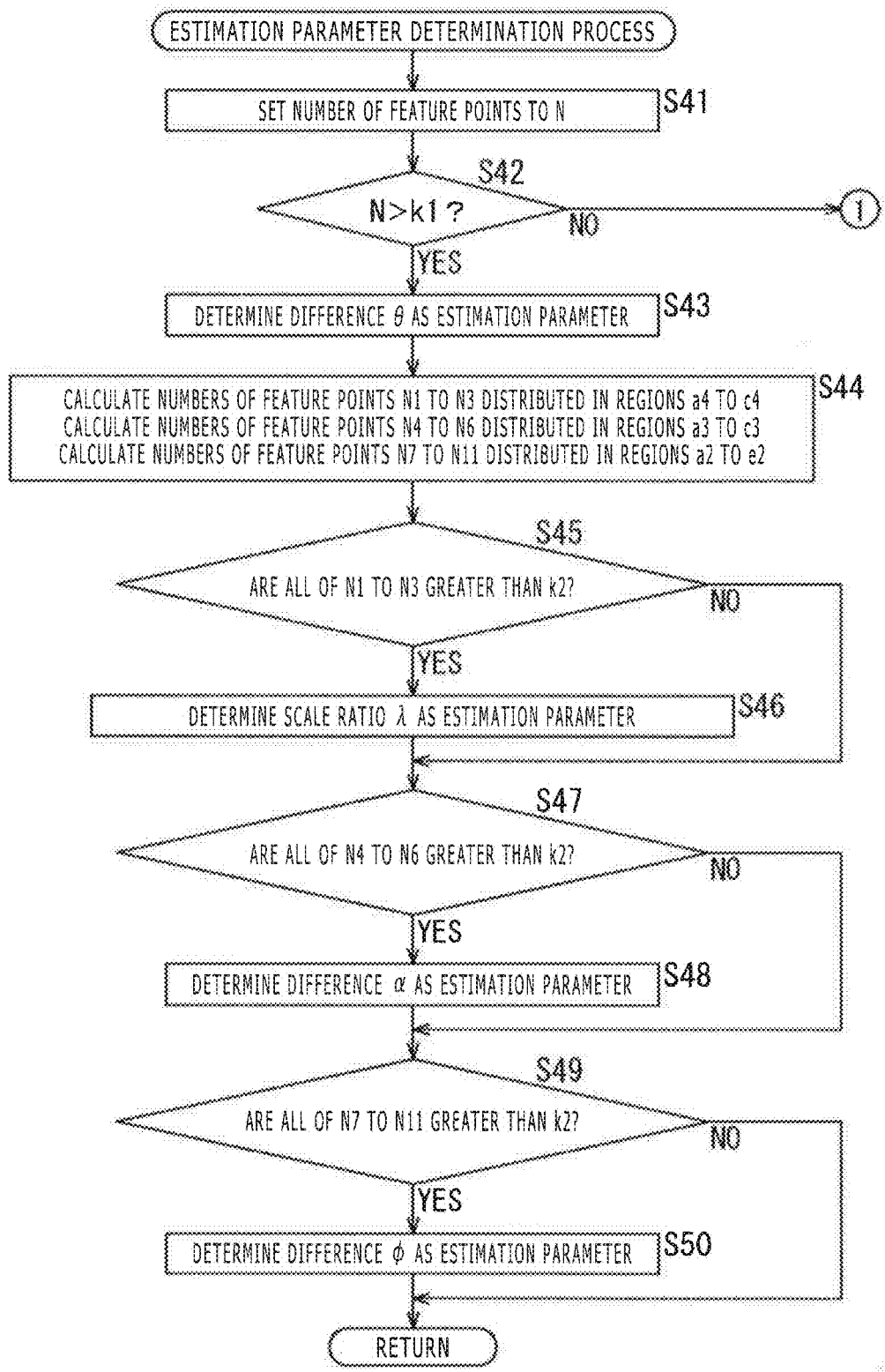
FIG. 9 is a flowchart explaining an estimation parameter determination process of FIG. 8 in detail.

FIG. 9 is a flowchart explaining the estimation parameter determination process in Step S19 of FIG. 8 in detail.

In Step S41 of FIG. 9, the distribution analysis section 44 sets the number of feature points corresponding to the left and right pair coordinates held in the left-right pair buffer 43 to N. In Step S42, the distribution analysis section 44 determines whether the number of feature points N is greater than a threshold k1 (for example, 100).

When it is determined in Step S42 that the number of feature points is equal to or smaller than the threshold k1, the process returns to Step S12 of FIG. 8 and the subsequent processes are performed. As a result, a new left image and a new right image are picked up and left and right pair coordinates within the new left and right images are added to the left-right pair buffer 43.

On the other hand, when it is determined in Step S42 that the number of feature points is greater than the threshold k1, the distribution analysis section 44 determines the difference θ as the estimation parameter and supplies the difference θ to the estimation section 45 in Step S43.

In Step S44, the distribution analysis section 44 calculates the numbers of feature points N1 to N3 corresponding to the left and right pair coordinates with respect to which the coordinates ($X_M$, $Y_M$) of the midpoints are distributed in the regions a4 to c4 of FIG. 6, respectively. In addition, the distribution analysis section 44 calculates the numbers of feature points N4 to N6 corresponding to the left and right pair coordinates with respect to which the coordinates ($X_M$, $Y_M$) of the midpoints are distributed in the regions a3 to c3 of FIG. 6, respectively. Further, the distribution analysis section 44 calculates the numbers of feature points N7 to N11 corresponding to the left and right pair coordinates with respect to which the coordinates ($X_M$, $Y_M$) of the midpoints are distributed in the regions a2 to e2 of FIG. 6, respectively.

Specifically, the distribution analysis section 44 reads out the left and right pair coordinates of the feature points from the left-right pair buffer 43. The distribution analysis section 44 computes the coordinates ($X_M$, $Y_M$) of the midpoint between the left and right pair coordinates of the feature points on the basis of the left and right pair coordinates of the feature points.

The distribution analysis section 44 sets the to-be-processed coordinates ($X_M$, $Y_M$) of the endpoints in sequence. When $Y_M$ in the to-be-processed coordinates ($Y_M$, $Y_M$) is equal to or smaller than −H/6, where H is a perpendicular size (height) of the picture plane, the distribution analysis section 44 increments the number of feature points N1 by one. On the other hand, when $Y_M$ is greater than −H/6 and smaller than H/6, the distribution analysis section 44 increments the number of feature points N2 by one. When the $Y_M$ is equal to or greater than H/6, the distribution analysis section 44 increments the number of feature points N3 by one. The distribution analysis section 44 determines the numbers of feature points N1 to N3 after the coordinates ($X_M$, $Y_M$) of all of the midpoints have been processed, as final numbers of feature points N1 to N3.

Furthermore, the distribution analysis section 44 sets the to-be-processed coordinates ($X_M$, $Y_M$) of the midpoints in sequence. When $X_M$ in the to-be-processed coordinates ($X_M$, $Y_M$) is equal to or smaller than −W/6, where W is a horizontal size (width) of the picture plane, the distribution analysis section 44 increments the number of feature points N4 by one. On the other hand, when $X_M$ is greater than −W/6 and, smaller than W/6, the distribution analysis section 44 increments the number of feature points N5 by one. When the $X_M$ is equal to or greater than W/6, the distribution analysis section 44 increments the number of feature points N6 by one. The distribution analysis section 44 determines the numbers of feature points N4 to N6 after the coordinates ($X_M$, $Y_M$) of all of the midpoints have been processed, as final numbers of feature points N4 to N6.

Moreover, the distribution analysis section 44 sets the to-be-processed coordinates ($X_M$, $Y_M$) of the midpoints in sequence. When $X_M$ in the to-be-processed coordinates ($Y_M$, $Y_M$) is equal to or smaller than −W/6 and $Y_M$ is equal to or smaller than −H/6, the distribution analysis section 44 increments the number of feature points N7 by one. On the other hand, when the $X_M$ is equal to or smaller than −W/6 and $Y_M$ is equal to or greater than H/6, the distribution analysis section 44 increments the number of feature points N8 by one. When the $X_M$ is equal to or greater than W/6 and $Y_M$ is equal to or smaller than −H/6, the distribution analysis section 44 increments the number of feature points N9 by one. Furthermore, when $X_M$ is equal to or greater than W/6 and $Y_M$ is equal to or greater than H/6, the distribution analysis section 44 increments the number of feature points N10 by one. When $X_M$ is greater than −W/6 and smaller than W/6 and $Y_M$ is greater than −H/6 and smaller than H/6, the distribution analysis section 44 increments the number of feature points N11 by one. The distribution analysis section 44 determines the numbers of feature points N7 to N11 after the coordinates ($X_M$, $Y_M$) of all of the midpoints have been processed, as final numbers of feature points N7 to N11.

In Step S45, the distribution analysis section 44 determines whether all of the numbers of feature points N1 to N3 are greater than a threshold k2 (for example, 50). When determining in Step S45 that all of the numbers of feature points N1 to N3 are greater than the threshold k2, the distribution analysis section 44 determines the scale ratio λ as the estimation parameter and supplies the scale ratio λ to the estimation section 45 in Step S46. The process then goes to Step S47.

On the other hand, when it is determined in Step S45 that at least one of the numbers of feature points N1 to N3 is equal to or smaller than the threshold k2, the process skips over Step S46 and goes to Step S47.

In Step S47, the distribution analysis section 44 determines whether all of the numbers of feature points N4 to N6 are greater than the threshold k2. When determining in Step S47 that all of the numbers of feature points N4 to N6 are greater than the threshold k2, the distribution analysis section 44 determines the difference α as the estimation parameter and supplies the difference α to the estimation section 45 in Step S48. The process then goes to Step S49.

On the other hand, when it is determined in Step S47 that at least one of the numbers of feature points N4 to N6 is equal to or smaller than the threshold k2, the process skips over Step S48 and goes to Step S49.

In Step S49, the distribution analysis section 44 determines whether all of the numbers of feature points N7 to N11 are greater than the threshold k2. When determining in Step S49 that all of the numbers of feature points N7 to N11 are greater than the threshold k2, the distribution analysis section 44 determines the difference φ as the estimation parameter and supplies the difference φ to the estimation section 45 in Step S50, The process returns to Step S19 of FIG. 8 and goes to Step S20.

On the other hand, when it is determined in Step S49 that at least one of the numbers of feature points N7 to N11 is equal to or smaller than the threshold k2, the process skips over Step S50, returns to Step S19 of FIG. 8, and goes to Step S20.

When the misalignment between the left image and the right image resulting from the difference θ is generated, many errors are generated in the stereo matching no matter small the misalignment is. Therefore, an importance level of estimation of the difference θ is high. For this reason, the difference θ is always determined as the estimation parameter in the estimation parameter determination process of FIG. 9.

On the other hand, an influence of the misalignment between the left image and the right image resulting from, for example, the scale ratio λ on a central portion of the picture plane is considered not to be critically generated. For this reason, in the estimation parameter determination process, the scale ratio λ is determined as the estimation parameter only when all of the numbers of feature points N1 to N3 are greater than the threshold k2, that is, the scale ratio λ can be estimated with sufficient accuracy.

As described so far, the imaging apparatus 10 estimates the parameter on the basis of the over-time misalignment model formula using at least one parameter out of the over-time misalignment parameters. Therefore, it is possible to change to-be-estimated parameters in response to, for example, the possible over-time misalignment of the stereo camera 21 or the like, and change the dominant cause of the perpendicular misalignment estimated by the estimation formula.

It is, therefore, possible to robustly correct the image misalignment generated due to the over-time misalignment of the stereo camera 21 with a small amount of computation. As a consequence, it is possible to guarantee the over-time misalignment of the stereo camera 21 with a low mechanical cost and implement a reasonable stereo camera as consumer product.

Furthermore, the imaging apparatus 10 determines whether each of the over-time misalignment parameters can be estimated with sufficient accuracy and estimates only the parameter determined to be able to be estimated with the sufficient accuracy. Therefore, the imaging apparatus 10 can ensure robustness of an estimation result.

<Second Embodiment>
(Example of Configuration of Second Embodiment of Imaging Apparatus)

Figure 10:
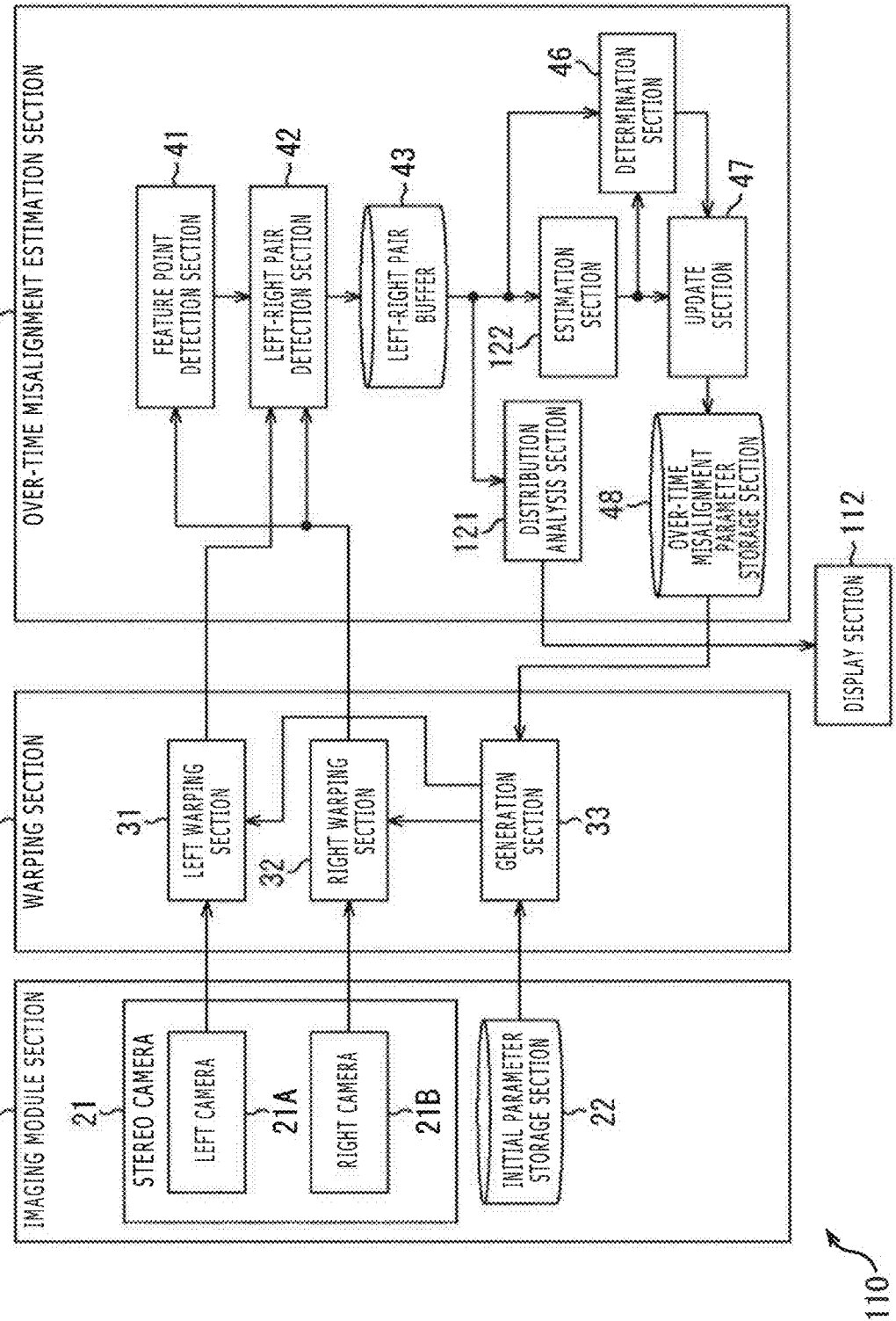
FIG. 10 is a block diagram illustrating an example of a configuration of a second embodiment of an imaging apparatus to which the present disclosure is applied.

FIG. 10 is a block diagram illustrating an example of a configuration of a second embodiment of an imaging apparatus to which the present disclosure is applied.

In the configuration depicted in FIG. 10, same constituent elements as those in FIG. 1 are denoted by the same reference characters. Repetitive description is omitted, as appropriate.

The configuration of an imaging apparatus 110 of FIG. 10 differs from that of the imaging apparatus 10 of FIG. 1 in that an over-time misalignment estimation section 111 is provided as an alternative to the over-time misalignment estimation section 13 and a display section 112 is newly provided. The imaging apparatus 110 determines the estimation parameter not on the basis of a distribution of the left and right coordinate pairs, but while controlling collection of the left and right coordinate pairs in such a manner as to be able to obtain the distribution of the left and right coordinate pairs that enables all of the over-time misalignment parameters to be estimated with sufficient accuracy.

Specifically, the configuration of the over-time misalignment estimation section 111 differs from that of the over-time misalignment estimation section 13 of FIG. 1 in that a distribution analysis section 121 and an estimation section 122 are provided as an alternative to the distribution analysis section 44 and the estimation section 45.

The distribution analysis section 121 of the over-time misalignment estimation section 111 reads out the left and right pair coordinates of the feature points from the left-right pair buffer 43. The distribution analysis section 121 computes coordinates of the midpoint between the left and right pair coordinates of the feature points on the basis of the left and right pair coordinates of the feature points. The distribution analysis section 121 (generation section) generates photographing instruction information for instructing the user on a photographing method in such a manner as to be able to obtain the distribution of the left and right coordinate pairs that enables all of the over-time misalignment parameters to be estimated, on the basis of the spatial distribution of the coordinates of the midpoints between the left and right pair coordinates of the feature points. The distribution analysis section 121 supplies the photographing instruction information to the display section 112.

The estimation section 122 reads out the left and right pair coordinates of the feature points from the left-right pair buffer 43. The estimation section 122 uses the perpendicular over-time misalignment model formula as the estimation formula for estimating the perpendicular misalignment. The estimation section 122 estimates the over-time misalignment parameter for use in the estimation formula on the basis of the left and right pair coordinates of the feature points and the estimation formula in such a manner as to make smallest the difference between the measured value of the perpendicular misalignment that is the difference between the left and right pair coordinates of the feature points in the perpendicular direction and the estimated value of the perpendicular misalignment calculated by the estimation formula. The estimation section 122 supplies the estimation formula into which the estimated over-time misalignment parameter is substituted to the determination section 46, and supplies the over-time misalignment parameter to the update section 47.

The display section 112 displays the photographing instruction information supplied from the distribution analysis section 121.

(First Example of Photographing Instruction Information)

Figure 11:
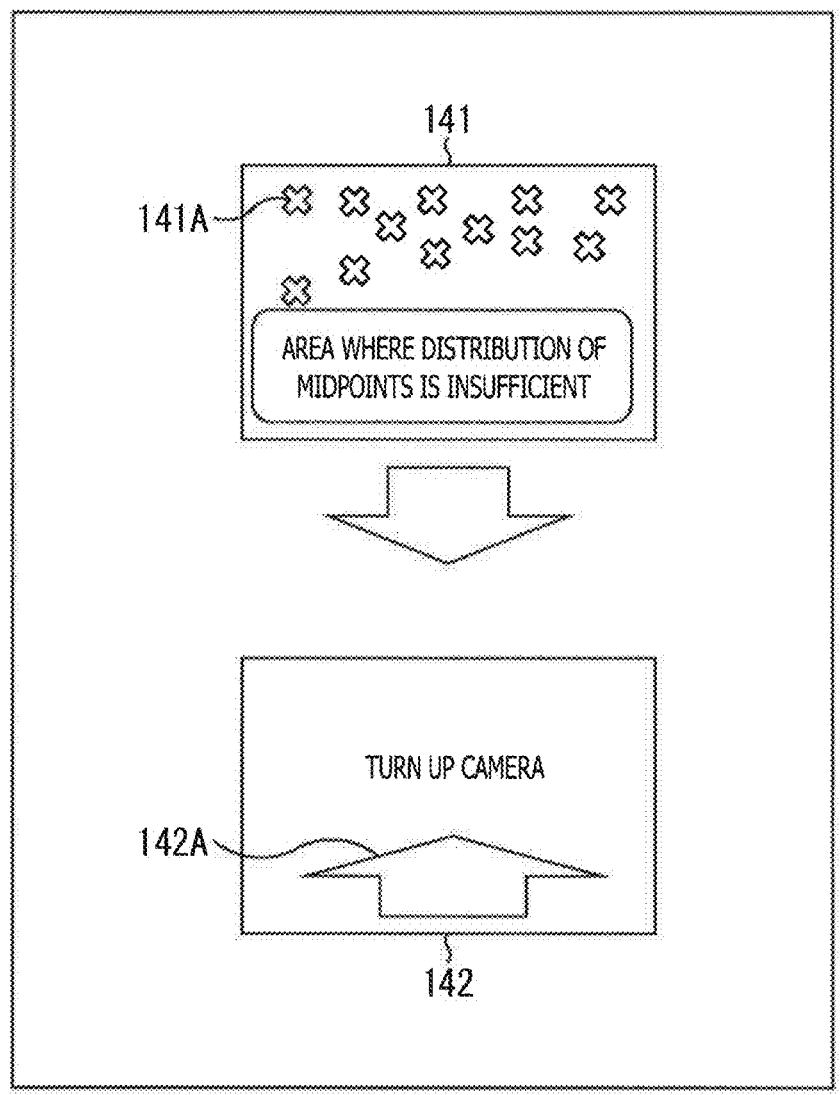
FIG. 11 is a diagram illustrating a first example of photographing instruction information.

FIG. 11 is a diagram illustrating a first example of the photographing instruction information.

As depicted in FIG. 11, if midpoints 141A between the left and right pair coordinates of the feature points are present only on an upper side of a picture plane 141 and the number of midpoints is insufficient on a lower side, the distribution analysis section 121 generates a message "TURN UP CAMERA" and an up arrow 142A as photographing instruction information 142. The photographing instruction information 142 configured with the message "TURN UP CAMERA" and the up arrow 142A is thereby displayed on the display section 112.

(Explanation of Change of Distribution of Midpoints Based on Photographing Instruction Information)

Figure 12:
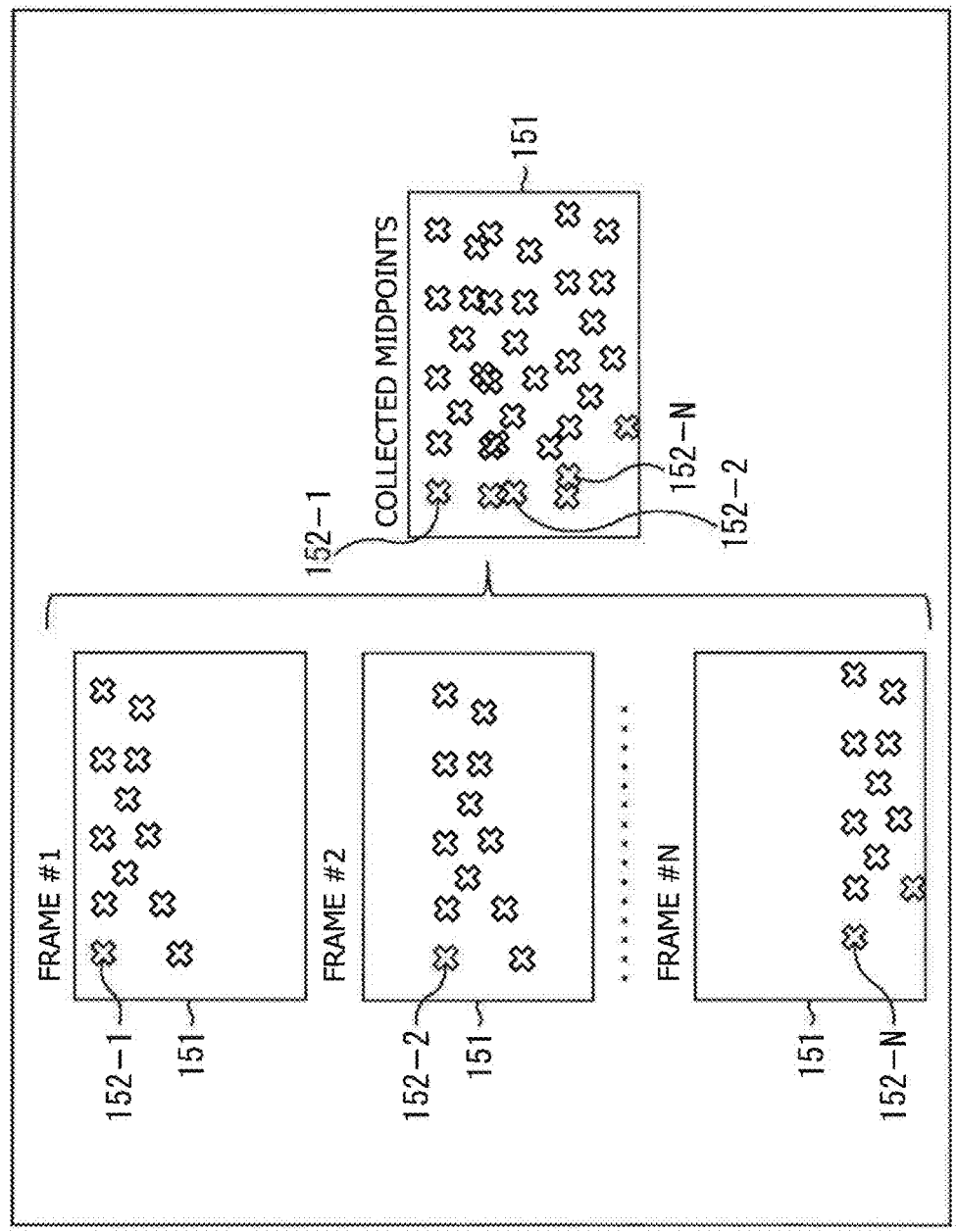
FIG. 12 is an explanatory diagram of a change of a distribution of midpoints based on the photographing instruction information of FIG. 11.

FIG. 12 is an explanatory diagram of a change of a distribution of the midpoints based on the photographing instruction information 142 of FIG. 11.

As depicted in FIG. 12, if midpoints 152-1 between the left and right pair coordinates of the feature points in frame #1 that is a first frame are present only on an upper side of a picture plane 151 and the number of midpoints is insufficient on a lower side, the photographing instruction information 142 is displayed on the display section 112.

When the user who has viewed the photographing instruction information 142 performs photographing with the stereo camera 21 turned up, the feature points corresponding to the midpoints 152-1 move downward within a left image and a right image of frame #2 that is the resultant second frame. Therefore, as depicted in FIG. 12, midpoints 152-2 between the left and right pair coordinates of the feature points are present below the midpoints 152-1. As a result, the midpoints 152-1 present on an uppermost side of the picture plane 151 and the midpoints 152-2 present below the midpoints 152-1 are collected.

Subsequently, in a similar manner, display of the photographing instruction information 142 on the display section 112 is repeated (N-2) times (where N is an integer greater than 2) to collect midpoints on a further lower side until the distribution of the midpoints in the picture plane 151 becomes a distribution that enables all of the over-time misalignment parameters to be estimated with sufficient accuracy.

As a result, the left images and the right images corresponding to N frames are photographed, and the distribution of the collected midpoints 152-1 to 152-N in the picture plane 151 becomes the distribution that enables all of the over-time misalignment parameters to be estimated with sufficient accuracy.

(Second Example of Photographing Instruction Information)

Figure 13:
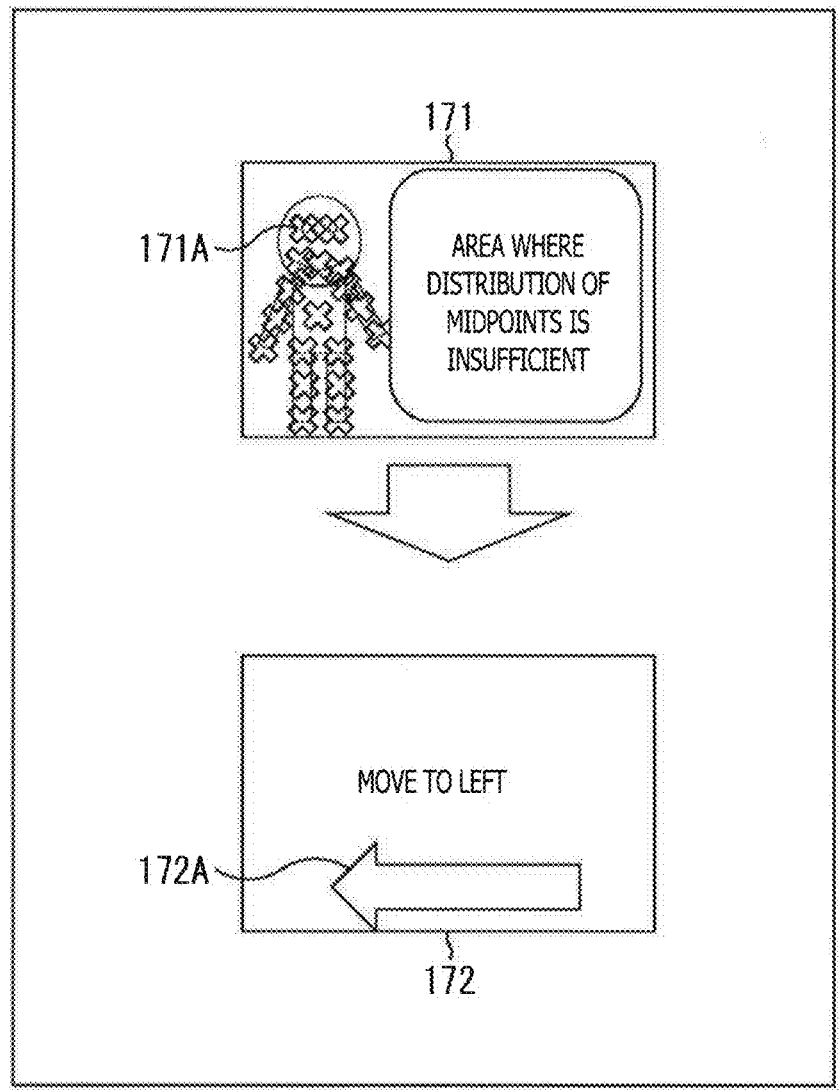
FIG. 13 is a diagram illustrating a second example of the photographing instruction information.

FIG. 13 is a diagram illustrating a second example of the photographing instruction information.

As depicted in FIG. 13, if midpoints 171A between the left and right pair coordinates of the feature points are present only on a left side of a picture plane 171 and the number of midpoints is insufficient on a right side, the distribution analysis section 121 generates a message "MOVE TO LEFT" and a left arrow 172A as photographing instruction information 172. The photographing instruction information 172 configured with the message "MOVE TO LEFT" and the left arrow 172A is thereby displayed on the display section 112.

When the user who has viewed the photographing instruction information 172 moves to the left and performs photographing, the feature points corresponding to the midpoints 171A move to the right within a left image and a right image that are newly photographed. It is, therefore, possible to collect the midpoints, which have been insufficient, on the right side of the picture plane 171.

(Explanation of Process By Imaging Apparatus)

Figure 14:
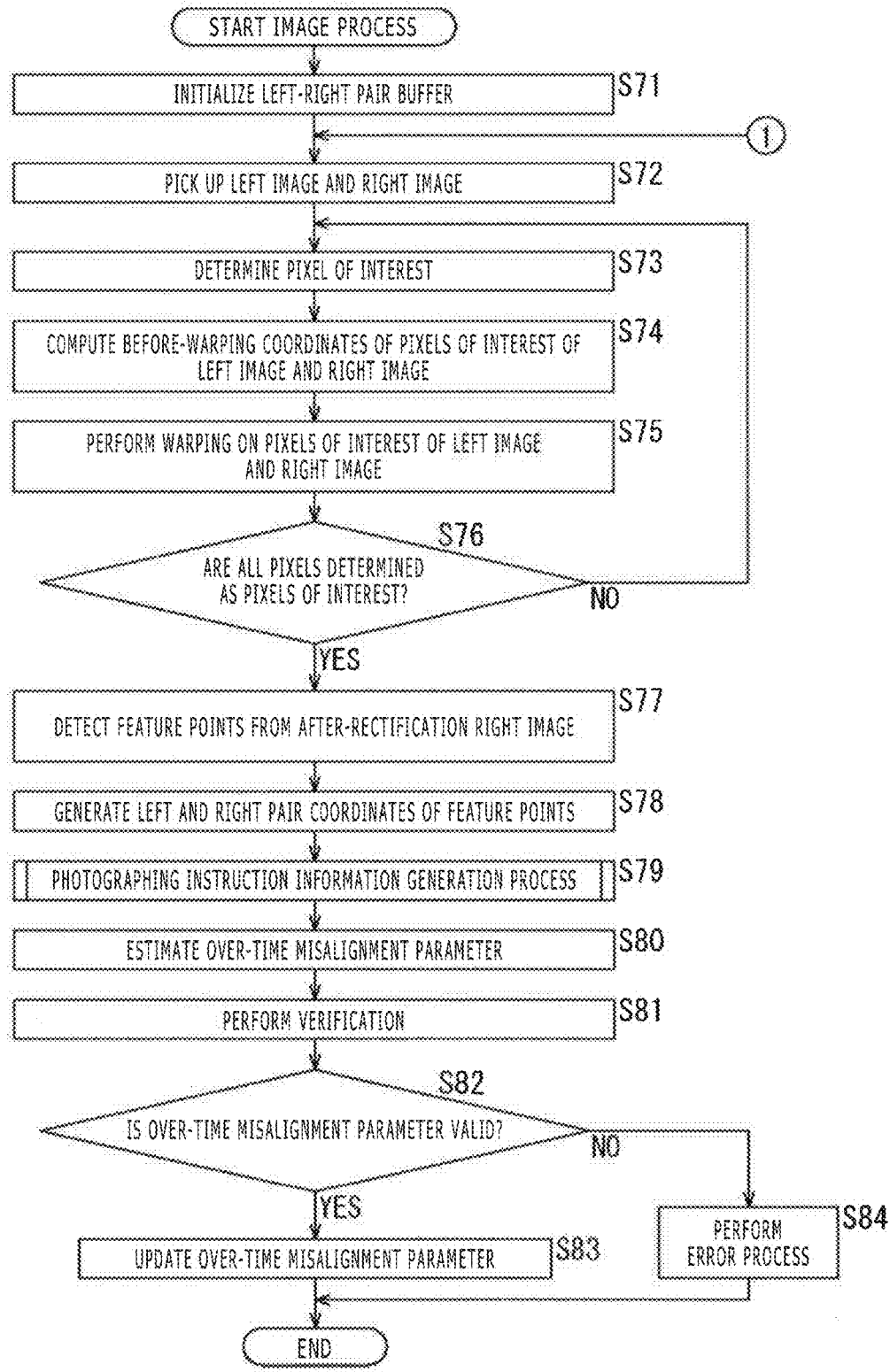
FIG. 14 is a flowchart explaining an image process by the imaging apparatus of FIG. 10.

FIG. 14 is a flowchart explaining an image process by the imaging apparatus 110 of FIG. 10.

Since processes from Steps S71 to S78 are similar to those from Steps S11 to S18 of FIG. 8, description is omitted.

In Step S79, the distribution analysis section 121 performs a photographing instruction information generation process for generating the photographing instruction information on the basis of the distribution of the left and right pair coordinates of the feature points held in the left-right pair buffer 43. This photographing instruction information generation process will be described in detail with reference to FIG. 15 to he referred to later on In Step S80, the estimation section 122 estimates the over-time misalignment parameter on the basis of the estimation formula that is the perpendicular over-time misalignment model formula and the left and right pair coordinates of the feature points held in the left-right pair buffer 43. The estimation section 45 supplies the estimation formula into which the estimated over-time misalignment parameter is substituted to the determination section 46, and supplies the over-time misalignment parameter to the update section 47.

In Step S81, the determination section 46 generates the histogram of the residuals on the basis of the left and right pair coordinates of the feature points held in the left-right pair buffer 43 and the estimation formula supplied from the estimation section 45, and performs verification on the basis of the histogram of the residuals. The determination section 46 supplies a verification result to the update section 47.

In Step S82, the update section 47 determines whether the over-time misalignment parameter is valid, that is, the verification result indicates that the over-time misalignment parameter is valid on the basis of the verification result supplied from the determination section 46.

When determining in Step S82 that the over-time misalignment parameter is valid, the update section 47 supplies, in Step S83, the over-time misalignment parameter supplied from the estimation section 45 to the over-time misalignment parameter storage section 48 to store the over-time misalignment parameter therein, thereby updating the over-time misalignment parameter. The imaging apparatus 110 then ends the process.

On the other hand, when it is determined in Step S83 that the over-time misalignment parameter is not valid, the imaging apparatus 110 notifies, in Step S84, the user that the rectification has not been performed successfully, performs an error process such as a request of retry, and ends the process.

Figure 15:
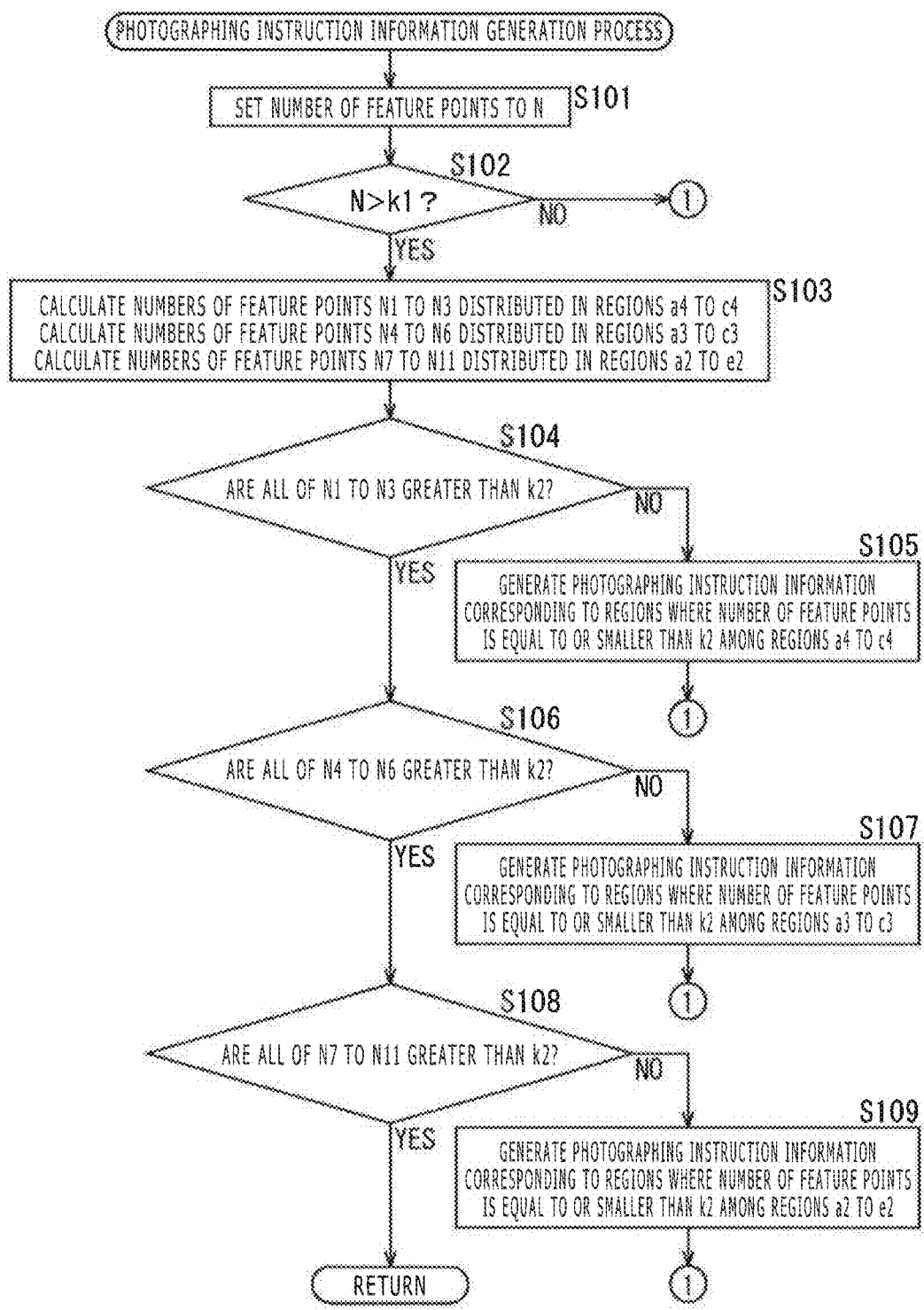
FIG. 15 is a flowchart explaining a photographing instruction information generation process of FIG. 14.

FIG. 15 is a flowchart explaining the photographing instruction information generation process in Step S79 of FIG. 14.

Since processes from Steps S101 to S104 of FIG. 15 are similar to those from Steps S41, S42, S44, and S45 of FIG. 9, description is omitted.

When it is determined in Step S104 that at least one of the numbers of feature points N1 to N3 is equal to or smaller than the threshold k2, the process goes to Step S105. In Step S105, the analysis analysis section 121 generates the photographing instruction information corresponding to the region where the number of feature points is equal to or smaller than k2 among the regions a4 to c4.

For example, the distribution analysis section 121 generates a message "CAST DOWN CAMERA" and a down arrow as the photographing instruction information corresponding to the region a4 when the number of feature points N1 is equal to or smaller than k2. Furthermore, the distribution analysis section generates the photographing instruction information 142 (FIG. 11) corresponding to the region c4 when the number of feature points N3 is equal to or smaller than k2. The distribution analysis section 121 supplies the generated photographing instruction information to the display section 112 to display the photographing instruction information thereon. The process then returns to Step S72 of FIG. 14 and the subsequent processes are performed.

On the other hand, when it is determined in Step S104 that all of the numbers of feature points N1 to N3 are greater than the threshold k2, the process goes to Step S106.

In Step S106, the distribution analysis section 121 determines whether all of the numbers of feature points N4 to N6 are greater than the threshold k2. When it is determined in Step S106 that at least one of the numbers of feature points N4 to N6 is equal to or smaller than the threshold k2, the process goes to Step S107.

In Step S107, the distribution analysis section 121 generates the photographing instruction information corresponding to the region where the number of feature points is equal to or smaller than k2 among the regions a3 to c3.

For example, the distribution analysis section 121 generates a message "MOVE TO RIGHT" and a right arrow as the photographing instruction information corresponding to the region a3 when the number of feature points N4 is equal to or smaller than k2. Furthermore, the distribution analysis section 121 generates the photograph instruction. Information 172 (FIG. 13) corresponding to the region c3 when the number of feature points N6 is equal to or smaller than k2. The distribution analysis section 121 supplies the generated photographing instruction information to the display section 112 to display the photographing instruction information thereon. The process then returns to Step S72 of FIG. 14 and the subsequent processes are performed.

On the other hand, when it is determined in Step S106 that all of the numbers of feature points N4 to N6 are greater than the threshold k2, the process goes to Step S108.

In Step S108, the distribution analysis section 121 determines whether all of the numbers of feature points N7 to N11 are greater than the threshold k2. When it is determined in Step S108 that at least one of the numbers of feature points N7 to N11 is equal to or smaller than the threshold k2, the process goes to Step S109.

In Step S109, the distribution analysis section 121 generates the photographing instruction information corresponding to the region where the number of feature points is equal to or smaller than k2 among the regions a2 to e2.

For example, the distribution analysis section 121 generates a message "TURN CAMERA TO LOWER RIGHT" and a lower right arrow as the photographing instruction information corresponding to the region a2 when the number of feature points N7 is equal to or smaller than k2. Furthermore, the distribution analysis section 121 generates a message "TURN CAMERA TO UPPER RIGHT" and an upper right arrow as the photographing instruction information corresponding to the region b2 when the number of feature points N8 is equal to or smaller than k2. The distribution analysis section 121 supplies the generated photographing instruction information to the display section 112 to display the photographing instruction information thereon. The process then returns to Step S72 of FIG. 14 and the subsequent processes are performed.

On the other hand, when it is determined in Step S103 that all of the numbers of feature points N7 to N11 are greater than the threshold k2, the process returns to Step S79 of FIG. 14 and goes to Step S80.

As described so far, the imaging apparatus 110 displays the photographing instruction information on the display section 112, so that it is possible to collect the feature points that enable all of the over-time misalignment parameters to be estimated with sufficient accuracy. As a consequence, it is possible to estimate all of the over-time misalignment parameters with sufficient accuracy.

In the second embodiment, when the feature points different in a perpendicular position are collected, the photographing instruction information for instructing the user to change a direction of the camera is generated. Alternatively, the photographing instruction information for instructing the user to move in the perpendicular direction may be generated. Furthermore, when the feature points different in a horizontal position are collected, the photographing instruction information for instructing the user to move is generated. Alternatively, the photographing instruction information for instructing the direction of the camera in the horizontal direction may be generated.

Moreover, the imaging apparatus 10 may collect the feature points not by displaying the photographing instruction information on the display section 112 but by automatically moving the stereo camera 21 using an actuator or the like.

<Explanation of Over-time Misalignment Parameters>

FIG. 16 is an explanatory diagram of the over-time misalignment parameters.

As depicted in FIG. 16, main causes of occurrence of the pitch angle difference θ among the over-time misalignment parameters are a distortion of a chassis and a substrate due to a stress applied from outside of a housing of the imaging apparatus 10 (110), and the like.

Furthermore, when the difference θ is generated, a perpendicular position misalignment (hereinafter, referred to as "Y misalignment") grows between the corresponding pixels within the left image and the right image in the entire picture plane. As a result, a matching error occurs in the stereo matching using the left image and the right image in the entire picture plane. Furthermore, a horizontal position misalignment (hereinafter, referred to as "X misalignment") occurs between the corresponding pixels within the left image and the right image in a diagonal region of the picture plane. As a result, an effective area that is an area of a region where a depth generated by the stereo matching in the picture plane decreases. Owing to this, when image recognition is performed using the depth, recognition accuracy greatly degrades. Therefore, the importance level of estimation of the difference θ is high.

Furthermore, the difference θ is relatively easy to estimate since the difference θ can be estimated with sufficient accuracy if a certain number of midpoints between the feature points are present in the entire picture plane.

Main causes of occurrence of the yaw angle difference φ are a warpage (deflection) of the chassis and the substrate due to generation of a temperature difference between a surface and a rear surface of the substrate by heat generation or the like in components mounted on the surface of the substrate of the imaging apparatus 10 (110), and the like.

When the difference φ is generated, the large x misalignment occurs in the entire picture plane and an error (misalignment) occurs in the depth (parallax) generated by the stereo matching. That is, absolute distance accuracy of the depth degrades in the entire picture plane. As a result, an application requiring the absolute distance accuracy of the depth is difficult to realize. Furthermore, when the difference φ is generated, the Y misalignment occurs in the diagonal region of the picture plane.

Moreover, the difference φ can be estimated with sufficient accuracy if the midpoints between the feature points are present mainly in the diagonal region of the picture plane. However, robust estimation of the difference φ is difficult since a Y misalignment amount is small compared with an x misalignment amount while the X misalignment and the Y misalignment possibly occur to the feature points simultaneously.

Main causes of occurrence of the roll angle difference α is rotation of the left camera 21A and the right camera 21B about Z-axes, and the like.

When the difference α is generated, the X misalignment frequently occurs on upper and lower ends of the picture plane and an error (misalignment) occurs in the depth (parallax) generated by the stereo matching. That is, the absolute distance accuracy of the depth degrades on the upper and lower ends of the picture plane. Furthermore, when the difference α is generated, the Y misalignment frequently occurs on left and right ends of the picture plane and many matching errors occur in the stereo matching. Owing to this, the effective area of the depth decreases on the left and right ends of the picture plane, and when image recognition is performed using the depth, the recognition accuracy degrades. However, the influence of the difference α on the central portion of the picture plane is slight.

Moreover, the difference α can be estimated with sufficient accuracy if the midpoints between the feature points are distributed in the horizontal direction of the picture plane.

Main causes of occurrence of the scale ratio λ is a variation of focal lengths of the left camera 21A and the right camera 21B due to generation of a temperature difference between the lenses, incorporated in the left camera 21A and the right camera 21B, each at the focal length having temperature dependence, and the like.

When the scale ratio λ is generated, the X misalignment frequently occurs on the left and right ends of the picture plane and an error (misalignment) occurs in the depth (parallax) generated by the stereo matching. That is, the absolute distance accuracy of the depth degrades on the left and right ends of the picture plane. Furthermore, when the scale ratio λ is generated, the misalignment frequently occurs on the upper and lower ends of the picture plane and a matching error frequently occurs in the stereo matching.

Owing to this, the effective area of the depth decreases on the upper and lower ends of the picture plane, and when image recognition is performed using the depth, the recognition accuracy degrades. However, the influence of the scale ratio λ on the central portion of the picture plane is slight.

Moreover, the scale ratio λ can be estimated with sufficient accuracy if the midpoints between the feature points are distributed in the perpendicular direction of the picture plane.

As described so far, the causes of occurrence of the parameters differ among one another. Therefore, whether each parameter occurs differs depending on a mechanical structure and a use condition of the imaging apparatus 10 (110). Therefore, the imaging apparatus 10 (110) may estimate only the parameter that possibly occurs depending on the mechanical structure and the use condition.

Furthermore, a degree of the influence of each parameter on an application differs depending on a type of the application using the depth. Therefore, the imaging apparatus 10 (110) may estimate only the parameter having a large degree of the influence on the to-be-executed application (process) depending on the application.

<Third Embodiment>
(Explanation of Computer to Which the Present Disclosure is Applied)

A series of processes described above can be either executed by hardware or executed by software. When a series of processes is executed by software, a program constituting the software is installed into to a computer. Here, types of the computer include a computer incorporated into dedicated hardware, a computer, for example, a general-purpose personal computer, capable of executing various functions by installing various programs into the computer, and the like.

Figure 17:
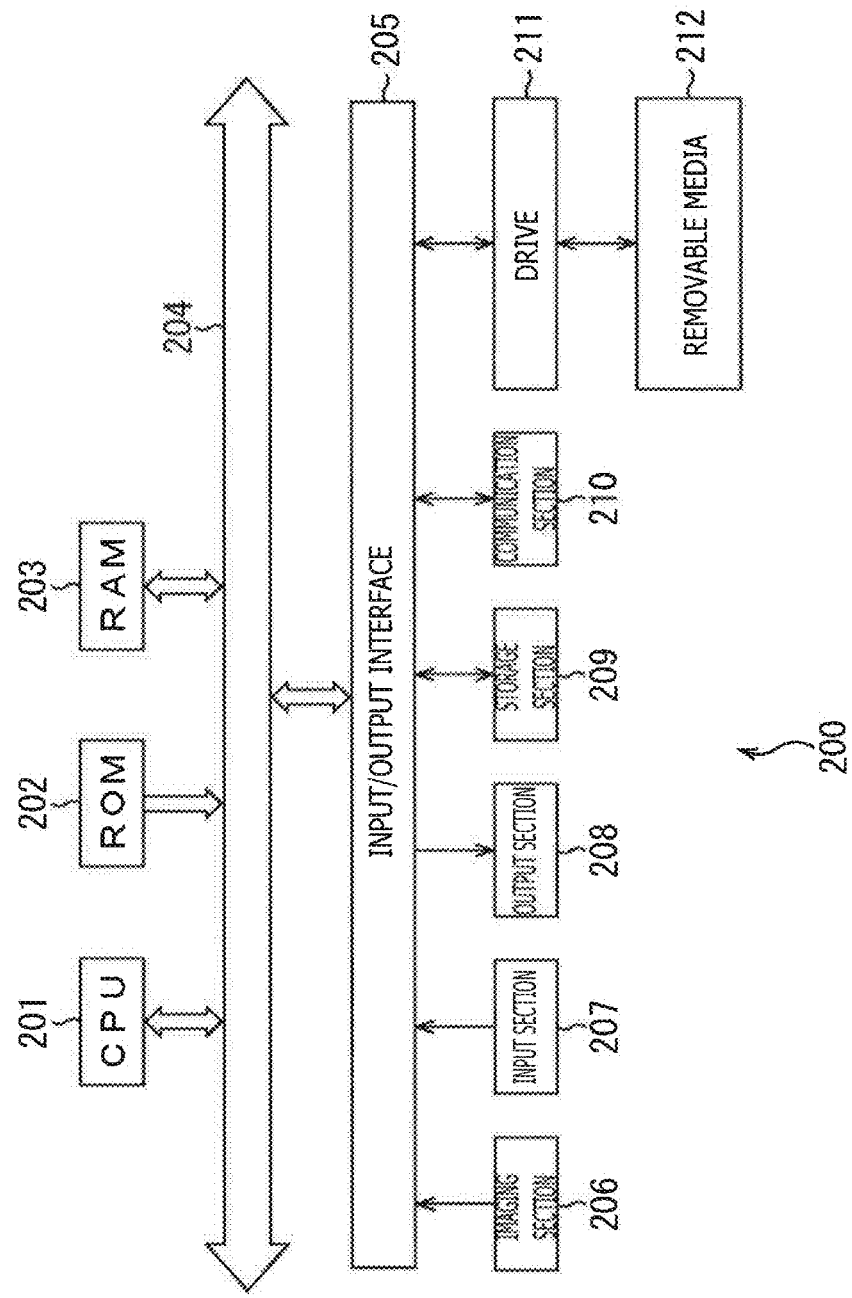
FIG. 17 is a block diagram illustrating an example of a configuration of hardware of a computer.

FIG. 17 is a block diagram illustrating an example of a configuration of the hardware of the computer executing a series of processes described above by the program.

In a computer 200, a CPU (Central Processing Unit) 201, a ROM (Read Only Memory) 202, and a RAM (Random Access Memory) 203 are mutually connected by a bus 204.

An input/output interface 205 is also connected to the bus 204. An imaging section 206, an input section 207, an output section 208, a storage section 209, a communication section 210, and a drive 211 are connected to the input/output interface 205.

The imaging section 206 is configured with the stereo camera 21. The input section 207 is composed of a keyboard, a mouse, a microphone, and the like. The output section 208 is composed of a display, a loudspeaker, and the like. The storage section 209 is composed of a hard disc, a nonvolatile memory, and the like. The communication section 210 is composed of a network interface and the like. The drive 211 drives a removable media 212 such as a magnetic disc, an optical disc, a magneto-optical disc or a semiconductor memory.

In the computer 200 configured as described above, the CPU 201 loads a program stored in, for example, the storage section 209 to the RAM 203 via the input/output interface 205 and the bus 204 and executes the program, whereby a series of processes described above is performed.

The program executed by the computer 200 (CPU 201) can be provided by, for example, recording the program in the removable media 212 serving as a package media or the like. Alternatively, the program can be provided via a wired or wireless transmission medium such as a local area network, the Internet, or a digital satellite service.

In the computer 200, the program can be installed into the storage section 209 via the input/output interface 205 by attaching the removable media 212 to the drive 211. Alternatively, the program can be received by the communication section 210 via the wired or wireless transmission medium and installed into the storage section 209. In another alternative, the program can be installed into the ROM 202 or the storage section 209 in advance.

The program executed by the computer 200 may be a program for performing processes in time series in an order described in the present specification or may be a program for performing the processes either in parallel or at necessary timing such as timing of calling.

<Fourth Embodiment>
(Vehicle Control System)

The technique according to the present disclosure can be applied to various products. For example, the technique according to the present disclosure may be realized as an apparatus mounted in any type of the vehicle, that is, any of a motor vehicle, an electric vehicle, a hybrid electric vehicle, and a two-wheeled vehicle.

FIG. 18 is a block diagram illustrating one example of a schematic configuration of a vehicle control system 2000 to which the technique according to the present disclosure can be applied. The vehicle control system 2000 includes a plurality of electronic control units connected to one another via a communication network 2010. In the example depicted in FIG. 18, the vehicle control system 2000 includes a drive system control unit 2100, a body system control unit 2200, a battery control unit 2300, a vehicle external information detection unit 2400, a vehicle internal information detection unit 2500, and an integrated control unit 2600. The communication network 2010 that connects the plurality of control units may be an in-vehicle communication network compliant with an arbitrary standard, for example, CAN (Controller Area Network), LIN (Local Interconnect Network), LAN (Local Area Network) or FlexRay (registered trade mark).

Each control unit includes a microcomputer that performs computing processes in accordance with various programs, a storage section that stores the programs executed by the microcomputer, parameters for use in various computation, and the like, and a drive circuit that drives apparatuses under various controls. Each control unit includes a network I/F (Interface) for holding communication with the other control units via the communication network 2010, and a communication I/F for holding communication over wired communication or wireless communication with apparatuses, sensors, and the like inside or outside of the vehicle. FIG. 18 illustrates, as functional constituent elements of the integrated control unit 2600, a microcomputer 2610, a general-purpose communication I/F 2620, a dedicated communication I/F 2630, a positioning section 2640, a beacon receiving section 2650, a cab apparatus I/F 2660, an audio visual output section 2670, an in-vehicle network I/F 2680, and a storage section 2690. Likewise, the other control units each include the microcomputer, the communication I/F, the storage section, and the like.

The drive system control unit 2100 controls operations performed by apparatuses associated with a vehicle drive system in accordance with various programs. For example, the drive system control unit 2100 functions as a controller over a driving force generator such as an internal combustion engine or a driving motor for generating a driving force of the vehicle, a driving force transmission mechanism for transmitting the driving force to wheels, a steering mechanism adjusting a steering angle of the vehicle, a brake that generates a braking force of the vehicle, and the like. The drive system control unit 2100 may function as a controller over an ABS (Antilock Brake System), an ESC (Electronic Stability Control), and the like.

A vehicle state detection section 2110 is connected to the drive system control unit 2100. The vehicle state detection section 2110 includes, for example, at least one of a gyroscope that detects an angular velocity of an axial rotation motion of a vehicle body, an acceleration sensor that detects an acceleration of the vehicle, and a sensor that detects a manipulated variable of an accelerator pedal, a manipulated variable of a brake pedal, a steering angle of a steering wheel, an engine speed, a wheel rotational speed, and the like. The drive system control unit 2100 performs a computing process using a signal input from the vehicle state detection section 2110, and controls the internal combustion engine, the driving motor, an electric power steering apparatus, the brake, and the like.

The body system control unit 2200 controls operations performed by various apparatuses provided in the vehicle body in accordance with various programs. For example, the body system control unit 2200 functions as a controller over a keyless entry system, a smart key system, a power window apparatus, and various lamps such as headlamps, back lamps, brake lamps, winkers, and fog lamps. In this case, radio waves or various switch signals transmitted from a mobile machine that acts as an alternative to a key can be input to the body system control unit 2200. The body system control unit 2200 receives the input radio waves or signals and exercises control over a door lock apparatus, the power window apparatus, the lamps, and the like of the vehicle.

The battery control unit 2300 exercises control over a secondary battery 2310 that is an electric power supply source for the driving motor in accordance with various programs. For example, information such as a battery temperature, a battery output voltage, or a battery remaining capacity is input to the battery control unit 2300 from a battery apparatus including the secondary battery 2310. The battery control unit 2300 performs a computing process using these signals, and exercises temperature regulation control over the secondary battery 2310 or control over a cooling unit or the like provided in the battery apparatus.

The vehicle external information detection unit. 2400 detects external information on the vehicle that mounts the vehicle control system 2000. For example, at least one of an imaging section 2410 and a vehicle external information detection section 2420 is connected to the vehicle external information detection unit 2400. The imaging section 2410 includes at least one of a ToF (Time Of Flight) camera, a stereo camera, a monocular camera, an infrared camera, and another camera. The vehicle external information detection section 2420 includes, for example, an environmental sensor for detecting current weather or a meteorological phenomenon, or a surrounding information detection sensor for detecting another vehicle, an obstacle, a pedestrian, or the like surrounding the vehicle that mounts the vehicle control system 2000.

The environmental sensor may be at least one of, for example, a raindrop sensor that detects rainy weather, a fog sensor that detects a fog, a sunlight sensor that detects a degree of sunlight, and a snow sensor that detects snow weather. The surrounding information detection sensor may be at least one of an ultrasonic sensor, a radar apparatus, and an LIDAR (Light Detection and Ranging, Laser Imaging Detection and Ranging) apparatus. The imaging section 2410 and the vehicle external information detection section 2420 may be provided either as sensors or apparatuses independent of each other or as an apparatus obtained by integrating a plurality of sensors or apparatuses.

Here, FIG. 19 illustrates an example of installation positions of the vehicle external information detection section 2410 and the imaging section 2420. Imaging sections 2910, 2912, 2914, 2916, and 2918 are each provided at a position that is at least one of, for example, a front nose, a sideview mirror, a rear bumper, a back door, and an upper portion of a cab windshield of a vehicle 2900. The imaging section 2910 provided on the front nose and the imaging section 2918 provided in the upper portion of the cab windshield mainly acquire front images of the vehicle 2900. The imaging sections 2912 and 2914 provided on the sideview mirrors mainly acquire side images of the vehicle 2900. The imaging section 2916 provided on the rear bumper or the back door mainly acquires a rear image of the vehicle 2900. The imaging section 2918 provided in the upper portion of the cab windshield is mainly used to detect a preceding vehicle, a pedestrian, an obstacle, a traffic light, a traffic sign, a traffic lane, or the like.

It is noted that FIG. 19 illustrates an example of photographing ranges of the imaging sections 2910, 2912, 2914, and 2916. An imaging range a denotes the Imaging range of the imaging section 2910 provided on the front nose, imaging ranges b and c denote the imaging ranges of the imaging sections 2912 and 2914 provided on the sideview mirrors, respectively, and an imaging range d denotes the imaging range of the imaging section 2916 provided on the rear bumper or the back door. For example, image data picked up by the imaging sections 2910, 2912, 2914, and 2916 is superimposed, thereby obtaining a bird's-eye view image of the vehicle 2900 viewed from above.

Vehicle external information detection sections 2920, 2922, 2924, 2926, 2928, and 2930 provided in any of a front portion, a rear portion, a side portion, a corner, and ice upper portion of the cab windshield of the vehicle 2900 may be, for example, ultrasonic sensors or radar apparatuses. The vehicle external information detection sections 2920, 2926, and 2930 provided on any of the front nose, the rear bumper, the back door, and the upper portion of the cab windshield of the vehicle 2900 may be, for example, LIDAR apparatuses. These vehicle external information detection sections 2920 to 2930 are used mainly to detect a preceding vehicle, a pedestrian, an obstacle, or the like.

Referring back to FIG. 18, description will be continued. The vehicle external information detection unit 2400 causes the imaging sections 2410 to pick up vehicle external images and receives picked-up image data. The vehicle external information detection unit 2400 also receives detection information from the vehicle external information detection sections 2420 connected thereto. If the vehicle external information detection sections 2420 are the ultrasonic sensors, die radar apparatuses, or the LIDAR apparatuses. Then die vehicle external information detection unit 2400 causes the vehicle external formation detection sections 2420 to transmit electromagnetic waves or the like and receives information on received reflected waves. The vehicle external information detection unit 2400 may perform an object detection process or a distance detection process on a person, a vehicle, an obstacle, sign, a character on a road surface, or the like on the basis of the received information. The vehicle external information detection unit 2400 may perform an environment recognition process for recognizing rainy weather, a fog, a road surface condition, or the like on the basis of the received information. The vehicle external information detection unit 2400 may calculate a distance to a vehicle external object on the basis of the received information.

Furthermore, the vehicle external information dejection unit 2400 may perform an image recognition process or a distance detection process for recognizing a person, a vehicle, an obstacle, a sign, a character on the road surface, or the like on the basis of the received image data. The vehicle external information detection unit 2400 may perform a process such as a distortion correction or positioning on the received image data, and synchronize image data picked up by the different imaging sections 2410 to generate a bird's-eye view image or a panorama image. The vehicle external information detection unit 2400 may perform a point-of-view transformation process using the image data picked up by the different imaging sections 2410.

The vehicle internal information detection unit 2500 detects vehicle internal information. A driver state detection section 2510 detecting a driver state, for example, is connected to the vehicle internal information detection unit 2500. The driver state detection section 2510 may include a camera that images a driver, a biological sensor that detects biological information on the driver, a microphone that collects sound in a cabin, or the like. The biological sensor is provided on, for example, a seat surface or the steering wheel, and detects biological information on a passenger seated on the seat or the driver who grips the steering wheel. The vehicle internal information detection unit 2500 may calculate a degree of fatigue or a degree of concentration of the driver or discriminate whether the driver is dozing off on the basis of detection information input from the driver state detection section 2510. The vehicle internal information detection unit 2500 may perform a process such as a noise cancelling process on a collected audio signal.

The integrated control unit 2600 exercises control over entire operations in the vehicle control system 2000 in accordance with various programs. An input section 2800 is connected to the integrated control unit 2600. The input section 2800 is realized by an apparatus, for example, a touch panel, a button, a microphone, a switch, or a lever, on which the passenger can perform an input operation. The input section 2800 may be, for example, a remote controller that uses an infrared ray or another radio wave, or may be an external connection apparatus such as a cellular telephone or a PDA (Personal Digital Assistant) corresponding to operation on the vehicle control system 2000. The input section 2800 may be, for example, a camera, and in this case, the passenger can input information by a gesture. Furthermore, the input section 2800 may include, for example, an input control circuit or the like that generates an input signal on the: basis of information input by the passenger or the like using the abovementioned. Input section 2800 and that outputs the input signal to the integrated control unit 2600. The passenger or the like inputs various data to the vehicle control system 2000 or instructs the vehicle control system 2000 to perform a processing operation by operating this input section 2800.

The storage section 2690 may include a RAM (Random Access Memory) that stores the various programs executed by the microcomputer and a ROM (Read Only Memory) that stores various parameters, computing results, sensor values, and the like. Furthermore, the storage section 2690 may be realize by a magnetic storage device, a semiconductor storage device, an optical storage device, a magneto-optical storage device, or the like such as an HDD (Hard Disc Drive).

The general-purpose communication I/F 2620 is a general-purpose communication I/F that intermediates in communication between the integrated control unit 2600 and various apparatuses present in an external environment 2750. The general-purpose communication I/F 2620 may implement a cellular communication protocol, such as GSM (registered trade mark) (Global System of Mobile communications), WiMAX (Worldwide Interoperability for Microwave Access), LTE (Long Term Evolution) or LTE-A (LTE-Advanced), or the other wireless communication protocol such as wireless LAN (also referred to as "Wi-Fi (Wireless Fidelity, registered trade mark)"), The general-purpose communication I/F 2620 may be connected to an apparatus (for example, an application server or a control server) present on an external network (for example, the Internet, a cloud network, or an operator specific network) via a base station or an access point, for example. Moreover, the general-purpose communication I/F 2620 may be connected to a terminal (for example, a terminal of a pedestrian or of a shop, or an MTC (Machine Type Communication) terminal) present near the vehicle using, for example, P2P (Peer To Peer) technology, The dedicated communication I/F 2630 is a communication I/F that supports a communication protocol developed for use in the vehicle. The dedicated communication I/F 2630 may, for example, implement a standard protocol such as WAVE (Wireless Access in Vehicle Environment) that is a combination between a lower layer that is IEEE Institute of Electrical and Electronic Engineers) 802.11p and an upper layer that is IEEE1609, or DSRC (Dedicated Short Range Communications). The dedicated communication I/F 2630 typically carries out V2X (Vehicle to Everything) communication that is a concept including one or more of V2V (Vehicle to Vehicle) communication, V2I (Vehicle to Infrastructure) communication, and V2P (Vehicle to Pedestrian) communication.

The positioning section 2640 receives, for example, a GNSS (Global Navigation Satellite System) signal from a GNSS satellite (for example, a GPS (Global Positioning System) signal from a GPS satellite) to execute positioning, and generates position information including a latitude, a longitude, and an altitude of the vehicle. It is noted that the positioning section 2640 may locate a current position by signal exchange with a wireless access point or acquire the position information from a terminal having a positioning function such as a cellular telephone, a PHS (Personal Handyphone System), or a smartphone.

The beacon receiving section 2650 receives radio waves or electromagnetic waves transmitted from, for example, wireless stations disposed on a road, and acquires information such as the current position, traffic congestion, a blocked road, or required time. It is noted that functions of the beacon receiving section 2650 may be included in the dedicated communication I/F 2630 described above.

The cab apparatus I/F 2660 is a communication interface that intermediates in connection between the microcomputer 2610 and various apparatuses present in the cabin. The cab apparatus I/F 2660 may establish wireless connection using a wireless communication protocol such as wireless LAN, Bluetooth (registered trade mark), NFC (Near Field Communication) or WUSB (Wireless USB). Moreover, the cab apparatus I/F 2660 may establish wired connection via a connection terminal (as well as a cable if necessary) that is not depicted. The cab apparatus I/F 2660 exchanges control signals or data signals with, for example, a mobile apparatus or a wearable apparatus owned by the passenger, or an information apparatus loaded into or attached to the vehicle.

The in-vehicle network I/F 2680 is an interface that intermediates in communication between the microcomputer 2610 and the communication network 2010. The in-vehicle network I/F 2680 transmits and receives signals and the like in accordance with a predetermined protocol supported by the communication network 2010.

The microcomputer 2610 in the integrated control unit 2600 controls the vehicle control system 2000 in accordance with the various programs on the basis of information acquired via at least one of the general-purpose communication I/F 2620, the dedicated communication I/F 2630, the positioning section 2640, the beacon receiving section 2650, the cab apparatus I/F 2660, and the in-vehicle network I/F 2680. For example, the microcomputer 2610 may compute a control target value for driving force generator, the steering mechanism, or the brake on the basis of the acquired vehicle internal/external information, and output a control command to the drive system control unit 2100. For example, the microcomputer 2610 may exercise cooperative control for the purpose of vehicle collision avoidance or impact mitigation, and following travelling, vehicle speed maintaining travelling, automatic driving or the like based on an inter-vehicle distance.

The microcomputer 2610 may generate local map information including surrounding information on the current position of the vehicle, on the basis of the information acquired via at least one of the general-purpose communication I/F 2620, the dedicated communication I/F 2630, the positioning section 2640, the beacon receiving section 2650, the cab apparatus I/F 2660, and the in-vehicle network I/F 2680. Moreover, on the basis of the acquired information, the microcomputer 2610 may predict a hazard such as a vehicle collision, coming close by a pedestrian or the like, or approach into a blocked road, and generate a warning signal. The warning signal may be, for example, a signal for producing a warning tone or turning on a warning lamp.

The audio visual output section 2670 transmits an output signal that is at least one of an audio signal and an image signal to an output apparatus that can visually or auditorily notify the passenger of the vehicle or outside of the vehicle of information. In the example of FIG. 18, an audio loudspeaker 2710, a display section 2720, and an instrument panel 2730 are exemplarily depicted as the output apparatuses. The display section 2720 may include at least one of, for example, an on-board display and a head-up display. The display section 2720 may have an AR (Augmented Reality) display function. The output apparatus may be an apparatus such as a headphone, a projector, or a lamp other than these apparatuses. If the output apparatus is a display apparatus, the display apparatus visually displays results obtained by various processes performed by the microcomputer 2610 or the information received from the other control units in various forms such as text, images, tables, and graphs. Moreover, output apparatus is an audio output apparatus, the audio output apparatus converts an audio signal configured with reproduced audio data, acoustic data or the like into an analog signal, and auditorily outputs the analog signal.

In the example depicted in FIG. 18, at least two control units connected to each other via the communication network 2010 may be integrated into one control unit. Alternatively, the individual control units may be each configured with a plurality of control units. In another alternative, the vehicle control system 2000 may include another control unit that is not depicted. Furthermore, in the description above, a part of or all of the functions assumed by any of the control units may be taken on by another control unit. In other words, as long as information is transmitted and received via the communication network 2010, a predetermined computing process may be performed by any of the control units. Likewise, the sensor or the apparatus connected to any of the control units may be connected to the other control units, and a plurality of control units may transmit and receive detection information to/from one another via the communication network 2010.

In the vehicle control system 2000 described so far, the imaging apparatus 10 (110) can be applied to, for example, the imaging section 2410 depicted in FIG. 18. The imaging section 2410 can thereby robustly correct a misalignment between a left image and a right image generated due to an over-time misalignment. As a result, the vehicle external information detection unit 2400 can detect a position or the like of a subject in a depth direction with high accuracy while using the corrected left image and the corrected right image.

Furthermore, the effects described in the present specification are given as an example only, and the effects are not limited to those described in the present specification and may contain other effects.

Moreover, the embodiments of the present disclosure are not limited to those described above and various changes and modifications can be made without departing from the spirit of the present disclosure.

For example, the stereo camera may be configured with two cameras disposed side by side not in the horizontal direction but in the perpendicular direction. In this case, the horizontal direction and the perpendicular direction in the description given above are replaced with each ether.

It is noted that the present disclosure can be configured as follows.

(1)

An image processing apparatus including:

an estimation section that estimates at least two parameters out of a etch angle difference, a yaw angle difference, and a roll angle difference between a first imaging section and a second imaging section, and a scale ratio of a first image picked up by the first imaging section to a second image picked up by the second imaging section, on basis of a model formula using the parameters.

(2)

The image processing apparatus according to (1), wherein the parameters are configured to include the pitch angle difference.

(3)

The image processing apparatus according to (1) or (2), wherein the estimation section estimates the parameters in such a manner as to make smallest a difference between an estimated value of a perpendicular misalignment between the first image and the second image calculated on the basis of the model formula and a measured value of the perpendicular misalignment between the first image and the second image.

(4)

The image processing apparatus according to (3), further including a detection section that detects a pair of a perpendicular position of each feature point within one of the first image and the second image and a perpendicular position of a point corresponding to the feature point within the other image, wherein the measured value is configured to be calculated on the basis of the pair.

(5)

The image processing apparatus according to (4), further including:

a distribution analysis section that selects the parameters estimated by the estimation section on the basis of a distribution of the feature points.

(6)

The image processing apparatus according to (4), further including:

a generation section that generates photographing instruction information for instructing a user on a photographing method using the first imaging section and the second imaging section on the basis of the distribution of the feature points.

(7)

The image processing apparatus according to any one of (3) to (6), further including:

an update section that updates the parameters on the basis of the difference between the estimated value of the perpendicular misalignment between the first image and the second image calculated on the basis of the model formula using the parameters estimated by the estimation section and the measured value.

(8)

The image processing apparatus according to any one of (1) to (7), wherein the parameters estimated by the estimation section are each configured to be determined on the basis of a structure of the first imaging section and the second imaging section.

(9)

The image processing apparatus according to any one of (1) to (8), wherein the parameters estimated by the estimation section are each configured to be determined on the basis of a type of a process executed using the first image and the second image (10)

The image processing apparatus according to any one of (1) to (9), further including:

a warping section that performs warping on the first image and the second image on the basis of the model formula using the parameters estimated by the estimation section.

(11)

The image processing apparatus according to (10), wherein the warping section is configured to perform the warping on the first image and the second image on the basis of the model formula and an initial parameter measured by a calibration.

(12)

An image processing method including:

an estimating step of estimating, by an image processing apparatus, at least two parameters out of a pitch angle difference, a yaw angle difference, and a roll angle difference between a first imaging section and a second imaging section, and a scale ratio of a first image picked up by the first imaging section to a second image picked up by the second imaging section, on basis of a model formula using the parameters.

REFERENCE SIGNS LIST

10: Imaging apparatus
21A: Left camera
21B: Right camera
31: Left warping section
32: Right warping section
41: Feature point detection section
44: Distribution analysis section
45: Estimation section
47: Update section
110: Imaging apparatus
121: Distribution analysis section
122: Estimation section
142, 172: Photographing instruction information

The invention claimed is:

1. An image processing apparatus comprising:
a distribution analysis section configured to
determine whether or not a parameter of a pitch angle difference between a first imaging section and a second imaging section is estimable with sufficient accuracy and utilized as one parameter of a plurality of estimation parameters, based on coordinates of a predetermined number or more of midpoints between image feature points being distributed in an entire region of a picture plane,
determine whether or not a parameter of a yaw angle difference between the first imaging section and the second imaging section is estimable with sufficient accuracy and utilized as one parameter of the plurality of estimation parameters, based on the coordinates of the predetermined number or more of the midpoints being distributed in an upper left region, a lower left region, an upper right region, a lower right region, and a central region when the picture plane is divided into 3×3 regions,
determine whether or not a parameter of a roll angle difference between the first imaging section and the second imaging section is estimable with sufficient accuracy and utilized as one parameter of the plurality of estimation parameters, based on the coordinates of the predetermined number or more of the midpoints being distributed in regions obtained by dividing the picture plane into a plurality of regions in a horizontal direction, and
determine whether or not a parameter of a scale ratio of a first image picked up by the first imaging section to a second image picked up by the second imaging section is estimable with sufficient accuracy and utilized as one parameter of the plurality of estimation parameters, based on the coordinates of the predetermined number or more of the midpoints being distributed in regions obtained by dividing the picture plane into a plurality of regions in a perpendicular direction;
an estimation section configured to estimate two or more parameters selected from a group of parameters consisting of the pitch angle difference, the yaw angle difference, the roll angle difference, and the scale ratio, wherein the parameters selected for estimation include only those parameters that have been determined by the distribution analysis section to be estimable with sufficient accuracy and utilized as one parameter of the plurality of estimation parameters; and
a warping section configured to perform warping on the first image and the second image based on a model formula using the parameters estimated by the estimation section, to thereby correct image misalignment,
wherein the distribution analysis section, the estimation section, and the warping section are each implemented via at least one processor.

2. The image processing apparatus according to claim 1, wherein the parameters selected for estimation are configured to include the pitch angle difference.

3. The image processing apparatus according to claim 1, wherein
the estimation section estimates the parameters in such a manner as to make smallest a difference between an estimated value of a perpendicular misalignment between the first image and the second image calculated based on the model formula and a measured value of the perpendicular misalignment between the first image and the second image.

4. The image processing apparatus according to claim 3, further comprising:
a detection section that detects a pair of a perpendicular position of each feature point within one of the first image and the second image and a perpendicular position of a point corresponding to the feature point within the other image, wherein
the measured value is configured to be calculated based on the pair, and
the detection section is implemented via at least one processor.

5. The image processing apparatus according to claim 4, wherein the distribution analysis section selects the parameters for estimation by the estimation section based on a distribution of the feature points.

6. The image processing apparatus according to claim 4, further comprising:
a generation section that generates photographing instruction information for instructing a user on a photographing method using the first imaging section and the second imaging section based on the distribution of the feature points,
wherein the generation section is implemented via at least one processor.

7. The image processing apparatus according to claim 3, further comprising:
an update section that updates the parameters based on the difference between the estimated value of the perpendicular misalignment between the first image and the second image calculated based on the model formula using the parameters estimated by the estimation section and the measured value,
wherein the update section is implemented via at least one processor.

8. The image processing apparatus according to claim 1, wherein
the parameters estimated by the estimation section are each configured to be determined based on a structure of the first imaging section and the second imaging section.

9. The image processing apparatus according to claim 1, wherein
the parameters estimated by the estimation section are each configured to be determined based on a type of a process executed using the first image and the second image.

10. The image processing apparatus according to claim 1, wherein
the warping section is configured to perform the warping on the first image and the second image based on the model formula and an initial parameter measured by a calibration.

11. An image processing method comprising:
determining, by an image processing apparatus, whether or not a parameter of a pitch angle difference between a first imaging section and a second imaging section is estimable with sufficient accuracy and utilized as one parameter of a plurality of estimation parameters, based on coordinates of a predetermined number or more of midpoints between image feature points being distributed in an entire region of a picture plane;
determining, by the image processing apparatus, whether or not a parameter of a yaw angle difference between the first imaging section and the second imaging section is estimable with sufficient accuracy and utilized as one parameter of the plurality of estimation parameters, based on the coordinates of the predetermined number or more of the midpoints being distributed in an upper left region, a lower left region, an upper right region, a lower right region, and a central region when the picture plane is divided into 3×3 regions;
determining, by the image processing apparatus, whether or not a parameter of a roll angle difference between the first imaging section and the second imaging section is estimable with sufficient accuracy and utilized as one parameter of the plurality of estimation parameters, based on the coordinates of the predetermined number or more of the midpoints being distributed in regions obtained by dividing the picture plane into a plurality of regions in a horizontal direction;
determining, by the image processing apparatus, whether or not a parameter of a scale ratio of a first image picked up by the first imaging section to a second image picked up by the second imaging section is estimable with sufficient accuracy and utilized as one parameter of the plurality of estimation parameters, based on the coordinates of the predetermined number or more of the midpoints being distributed in regions obtained by dividing the picture plane into a plurality of regions in a perpendicular direction;
estimating, by the image processing apparatus, two or more parameters selected from a group of parameters consisting of the pitch angle difference, the yaw angle difference the roll angle difference, and the scale ratio, wherein the parameters selected for estimation include only those parameters that have been determined by the image processing apparatus to be estimable with sufficient accuracy and utilized as one parameter of the plurality of estimation parameters; and
correcting image misalignment by performing warping on the first image and the second image based on a model formula using the parameters estimated by the image processing apparatus.

12. A non-transitory computer-readable medium having embodied thereon a program, which when executed by at least one processor of an image processing apparatus causes the image processing apparatus to execute an image processing method, the method comprising:
determining, by the image processing apparatus, whether or not a parameter of a pitch angle difference between a first imaging section and a second imaging section is estimable with sufficient accuracy and utilized as one parameter of a plurality of estimation parameters, based on coordinates of a predetermined number or more of midpoints between image feature points being distributed in an entire region of a picture plane;
determining, by the image processing apparatus, whether or not a parameter of a yaw angle difference between the first imaging section and the second imaging section is estimable with sufficient accuracy and utilized as one parameter of the plurality of estimation parameters, based on the coordinates of the predetermined number or more of the midpoints being distributed in an upper left region, a lower left region, an upper right region, a lower right region, and a central region when the picture plane is divided into 3×3 regions;

determining, by the image processing apparatus, whether or not a parameter of a roll angle difference between the first imaging section and the second imaging section is estimable with sufficient accuracy and utilized as one parameter of the plurality of estimation parameters, based on the coordinates of the predetermined number or more of the midpoints being distributed in regions obtained by dividing the picture plane into a plurality of regions in a horizontal direction;

determining, by the image processing apparatus, whether or not a parameter of a scale ratio of a first image picked up by the first imaging section to a second image picked up by the second imaging section is estimable with sufficient accuracy and utilized as one parameter of the plurality of estimation parameters, based on the coordinates of the predetermined number or more of the midpoints being distributed in regions obtained by dividing the picture plane into a plurality of regions in a perpendicular direction;

estimating, by the image processing apparatus, two or more parameters selected from a group of parameters consisting of the pitch angle difference the yaw angle difference the roll angle difference, and the scale ratio, wherein the parameters selected for estimation include only those parameters that have been determined by the image processing apparatus to be estimable with sufficient accuracy and utilized as one parameter of the plurality of estimation parameters; and correcting image misalignment by performing warping on the first image and the second image based on a model formula using the parameters estimated by the image processing apparatus.

\* \* \* \* \*